US 6,604,371 B2

(12) United States Patent
Ueno

(10) Patent No.: US 6,604,371 B2
(45) Date of Patent: Aug. 12, 2003

(54) OIL AMOUNT DETECTOR, REFRIGERATION APPARATUS AND AIR CONDITIONER

(75) Inventor: Kiyotaka Ueno, Shizuoka (JP)

(73) Assignee: Toshiba Carrier Corporation, Tokyo (JP)

( * ) Notice: Subject to any disclaimer, the term of this patent is extended or adjusted under 35 U.S.C. 154(b) by 92 days.

(21) Appl. No.: 09/937,101

(22) PCT Filed: Jan. 18, 2001

(86) PCT No.: PCT/JP01/00306
§ 371 (c)(1),
(2), (4) Date: Sep. 20, 2001

(87) PCT Pub. No.: WO01/53757
PCT Pub. Date: Jul. 26, 2001

(65) Prior Publication Data
US 2003/0066302 A1 Apr. 10, 2003

(30) Foreign Application Priority Data

Jan. 21, 2000 (JP) ........................... 2000-013194
Jan. 21, 2000 (JP) ........................... 2000-013195
Jan. 21, 2000 (JP) ........................... 2000-013196

(51) Int. Cl.[7] ............................................. F25B 43/02
(52) U.S. Cl. ............................. 62/193; 62/129; 62/470
(58) Field of Search ........................ 62/160, 192, 193, 62/194, 468, 469, 470, 471, 472, 473, 84, 510, 151, 155, 156, 125, 126, 129, 127

(56) References Cited

U.S. PATENT DOCUMENTS 5,245,837 A  9/1993  Kitamoto ..................... 62/175
5,321,956 A  6/1994  Kemp et al. .................. 62/193
5,347,821 A  9/1994  Oltman et al. ................. 62/84
5,361,595 A  11/1994 Shimura et al.
5,586,450 A  * 12/1996 Tollar et al. ................... 62/192
5,673,570 A  10/1997 Sada

FOREIGN PATENT DOCUMENTS

DE  41 40 625   6/1993
EP  0 403 239   12/1990
EP  0 563 570   10/1993
EP  0 715 132   6/1996
EP  0 715 133   6/1996
EP  0 838 640   4/1998
JP  5-164417    6/1993

* cited by examiner

Primary Examiner—Harry B. Tanner
(74) Attorney, Agent, or Firm—Pillsbury Winthrop LLP

(57) ABSTRACT

An oil holding tank (40) is communicated to the case (10c) of the compressor (10). Part of the refrigerant discharged from the compressor (10) is introduced into the oil holding tank (40) so that the lubrication oil (L) is allowed to flow out from the oil holding tank (40) and the lubrication oil (L) which flows out is allowed to return to the case (10c). The presence of the lubrication oil (L) is detected from a comparison between the temperature (TK1) of the refrigerant introduced from the compressor (10) to the oil holding tank (40) and the temperature (TK2) of the lubrication oil (4) flowing out from the oil holding tank (40). On the basis of the result of the detection, it is judged whether or not the amount of the lubrication oil (L) in the case (10c) is appropriate.

28 Claims, 15 Drawing Sheets

OIL AMOUNT DETECTOR, REFRIGERATION APPARATUS AND AIR CONDITIONER

This application is the National Phase of International Application PCT/JP01/00306 filed Jan. 18, 2001 which designated the U.S. and that International Application was published under PCT Article 21(2) in English.

TECHNICAL FIELD

The present invention relates to an oil amount detector for detecting an amount of lubrication oil in a case of a compressor, a refrigeration apparatus and an air conditioner wherein the oil amount detector is attached.

BACKGROUND ART

A compressor such as an air conditioner attached on a refrigeration apparatus is covered with a case so that a refrigerant is sucked into the case and the sucked refrigerant is compressed to and discharged to the outside. Lubrication oil is filled in the case. A part of the lubrication oil flows into the refrigerating cycle together with the refrigerant as the compressor discharges the refrigerant. Consequently, it sometimes happen that the supply of the lubrication oil becomes insufficient in the compressor. When the supply of the lubrication oil becomes insufficient, a sliding portion comes to run out of the oil, which exerts an unfavorable influence upon the life of the compressor.

As means for coping with such disadvantage, there is known a float switch style oil surface adjuster as shown in Jpn. Pat. Appln. KOKAI Publication No. 5-164417. This oil surface adjuster takes in lubrication oil in the case into a vessel by means of an even oil tube to detect an oil surface (an oil amount) with a vertical movement of a float floating on a surface inside of the vessel.

On the other hand, as means for bringing back into the case of the compressor the lubrication oil discharged together with the refrigerant from the compressor, there is known an oil separator. For example, in the invention disclosed in Japanese Unexamined Patent Publication No. 4-184048, the oil separator is provided on piping on the side of discharging the refrigerant of the compressor, so that the lubrication oil discharged together with the refrigerant is caught with the oil separator and the lubrication oil which is retained in the oil separator is brought back to the piping of on the side of sucking the refrigerant of the compressor in the case where the supply of the lubrication oil becomes insufficient in the compressor.

Like the float switch style oil surface adjuster, when the oil separator detects the oil surface with a mechanical float switch, a trouble is likely to be generated. Furthermore, when the compressor is suspended, the refrigerant is liquefied to be retained in the case of the compressor, and the piping of the refrigerating cycle. In this case, the liquid refrigerant is mixed into the lubrication oil so that the lubrication oil is dissolved with the result that the oil surface in the case has risen to the position higher than the actual amount. In such a situation, in the above oil surface adjuster, an ostensible oil surface including the liquid refrigerant is detected so that an accurate detection of the oil surface cannot be made. In actuality, even when the supply of the lubrication oil is insufficient, the operation of the compressor continues as it is. In the end, an unfavorable influence is exerted to the life of the compressor is some cases.

On the other hand, in an example of the oil separator, a long time is required until a predetermined amount (an oil return amount required for the maintenance of the oil surface of the compressor) of the lubrication oil is retained in the oil separator next after the lubrication oil retained in the oil separator is once brought back to the compressor. Consequently the shortage of the lubrication oil in the compressor cannot be swiftly settled which, in the end, exerts an unfavorable influence to the life of the compressor. There is also a problem in that the capacity of the oil separator becomes large in order to secure a sufficient oil replacement amount for the maintenance of the oil surface of the compressor with the result that the separator itself becomes large.

DISCLOSURE OF INVENTION

The present invention has been made in view of the above circumstances, and an object of the invention is to precisely detect an amount of oil in the case of the compressor in good reliability without using a mechanical switch.

The present invention provides an oil amount detector of a compressor which has a case in which lubrication oil is filled, and which sucks and compresses the refrigerant and discharges the refrigerant from the case, the detector comprising:

an oil holding tank communicated to the case;

a pressuring pipe for introducing part of the refrigerant discharged from the compressor into a oil holding tank for use in pressurization for allowing oil to flow out from the oil holding tank;

a return pipe for allowing oil flowing out of the oil holding tank to return to the case a first temperature sensor for detecting a temperature of the refrigerant which introduced to the oil holding tank;

a second temperature sensor for detecting a temperature of oil which flowing out from the oil holding tank; and detection means for detecting an oil amount in the case from a comparison between the detected temperature of the first temperature sensor and the detected temperature of the second temperature sensor.

BEST MODE FOR CARRYING OUT OF THE INVENTION

Figure 1:
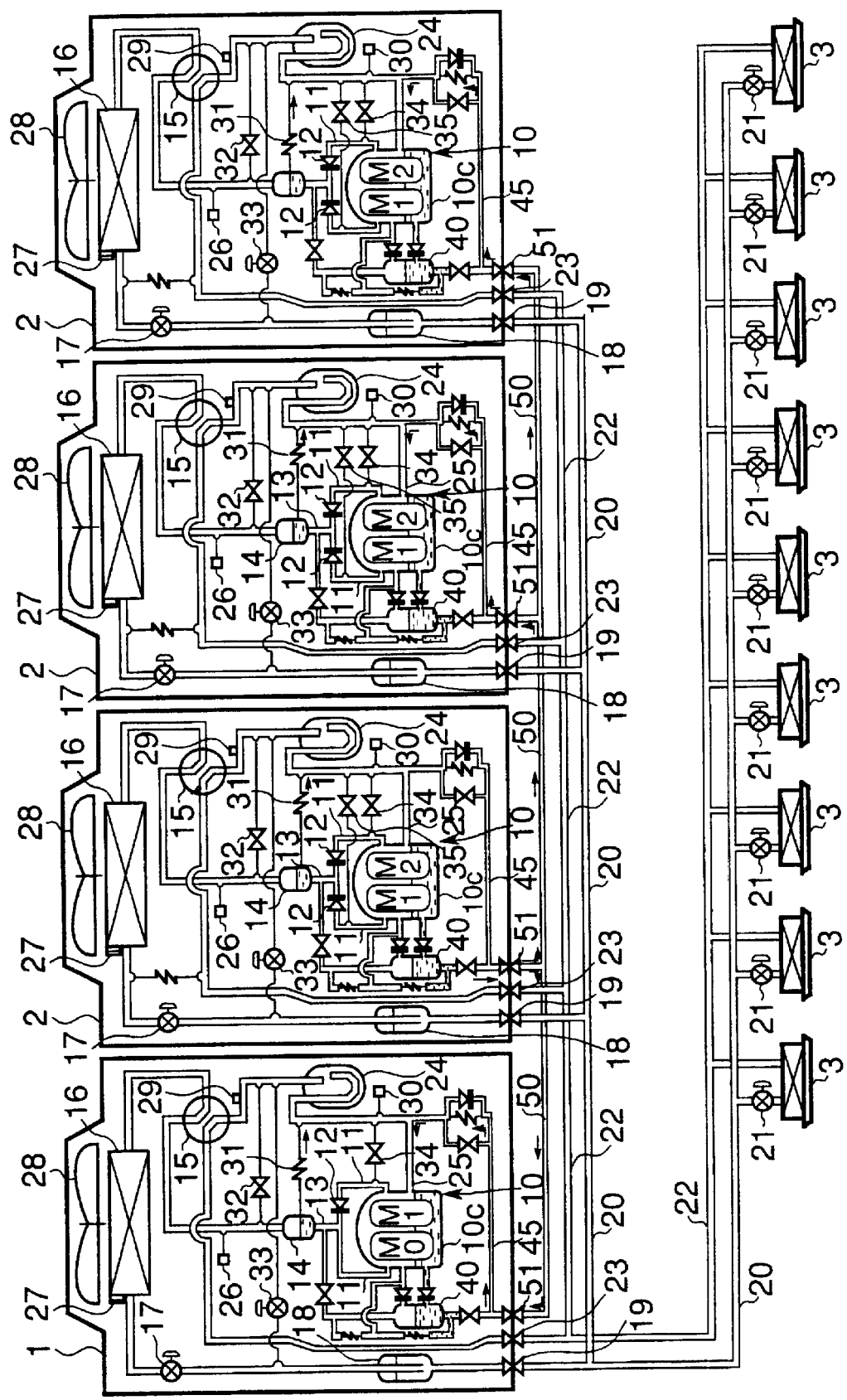
FIG. 1 is a view showing an overall structure of a first to a fifth embodiment.

[1] A first embodiment of the present invention will be explained hereinbelow by referring to the drawings.

In FIG. 1, a center outdoor unit 1 is provided with a low-pressure type compressor 10. The compressor 10 is covered with a closed type case 10c so that refrigerant is sucked and compressed, and is discharged from the case 10c. The case 10c accommodates a variable speed motor MO and a rated speed motor M1. At the same time, oil (hereinafter referred to as lubrication oil) is filled for lubrication for a slide portion driven with these motors.

When a four-way valve 15 (in the state shown in the drawings) is turned off, a refrigerant (a gas) discharged from the compressor 10 flows to an indoor heat exchanger 16 through two pipes 11 on the side of discharging the refrigerant, a check valve 12, a pipe 13 on the high pressure side, an oil separator 14 and a change-over valve, for example, a four-way valve 15. The refrigerant flown into the outdoor heat exchanger 16 radiates heat to the outdoor air to be liquefied. The refrigerant (the liquid refrigerant) which has passed through the outdoor heat exchanger 16 flows into the indoor units 3 via an expansion valve 17, a liquid receiver 18, a packed valve 19, a pipe 20 on the liquid side, and each of the flow control valves 21. The refrigerant which has flown into each of the indoor units 3 deprives heat of the indoor air to be evaporated. As a consequence, the inside of the air-conditioned room is cooled. The refrigerant (the gas) which has passed through each of the indoor units 3 is sucked into the compressor 10 through a pipe 22 on the gas side, a packed valve 23, the four-way valve 15, a liquid separator 24 and a pipe 25 on the side of sucking the refrigerant.

When the four-way valve 15 is turned on, the refrigerant (the gas) discharged from the compressor 10 flows in each of the indoor units 3 through each of the pipes 11, the check valve 12, the pipe 13, the oil separator 14, the four-way valve 15, the packed valve 23, and the pipe 22. The refrigerant which has flown into each of the indoor units 3 radiates heat to the indoor air to be liquefied. Thus, the air-conditioned room is warmed. The refrigerant (the liquid refrigerant) which has passed through each of the indoor units 3 flows to the outdoor heat exchanger 16 via each of the flow control valves 21, the pipe 20, the packed valve 19, the liquid receiver 18 and the expansion valve 17. The refrigerant flown into the outdoor heat exchanger 16 deprives heat of the outdoor air to be evaporated. The refrigerant (the gas) which has passed through the outdoor heat exchanger 16 is sucked into the compressor 10 via the four-way valve 15, the liquid separator 24 and the pipe 25.

A pressure sensor (a high-pressure sensor) 26 is provided for detecting a pressure Pd of the high-pressure refrigerant discharged from the compressor 10 on the pipe on the high-pressure side between the oil separator 14 and the four-way valve 15. The outdoor heat exchanger 16 is provided with a temperature sensor (a temperature sensor of the heat exchanger) 27. An outdoor fan 28 is provided in the vicinity of the outdoor heat exchanger 16. A temperature sensor 29 for detecting the temperature of the low-pressure refrigerant is attached on the pipe on the side of the low pressure between the four-way valve 15 and the liquid separator 24. A pressure sensor (a low pressure sensor) 30 for detecting the pressure Ps of the low-pressure refrigerant is attached on the pipe 25.

Lubrication oil retained in the oil separator 14 flows to the pipe 25 via a capillary tube 31. A release bypass is connected via an open and close valve 32 from the pipe on a high-pressure side between the oil separator 14 and the four-way valve 15 up to the pipe on a low-pressure side between the four-way valve 15 and liquid separator 24. A cooling bypass is connected via flow control valves 33 from the pipe on the side of the liquid between the expansion valve 17 and the liquid receiver 18 up to the piping on the low-pressure side between the four-way valve 15 and the liquid separator 24.

On the other hand, along with the center outdoor units 1, a plurality of terminal outdoor units 2 are installed. Each of the outdoor units 2 is provided with a low-pressure type compressor 10. The compressor 10 is covered with a closed type case 10c, and the compressor 10 sucks and compresses refrigerant to discharge the refrigerant from the case 10c. The case 10c accommodates two rated speed motors M1 and M2, and at the same time, the case 10c is filled with lubrication oil for the lubrication of the slide portion.

Each of the outdoor units 2 is the same as the center outdoor unit 1 except for the fact that the outdoor units 2 have rated speed motors M1 and M2, each of the pipes 11 is provided with check valves 12, a gas balance bypass is connected via the valves 34 and 35 from each of the pipes 11 up to the pipe on the side of sucking the refrigerant. These outdoor units 2 are connected in parallel to the center outdoor unit 1 respectively via the pipe 20 on the side of the liquid and the pipe 22 on the side of the gas. The pipes 20 on the side of the liquid are shared by one pipe and the pipes 22 on the side of the gas are shared by one pipe.

With the connection of these pipings, a heat pump type refrigerating cycle is constituted.

On the outdoor unit 1 and each of the outdoor units 2, a packed valve 51 is provided respectively. An oil balance pipe 50 is connected mutually between respective packed valves 51.

Figure 2:
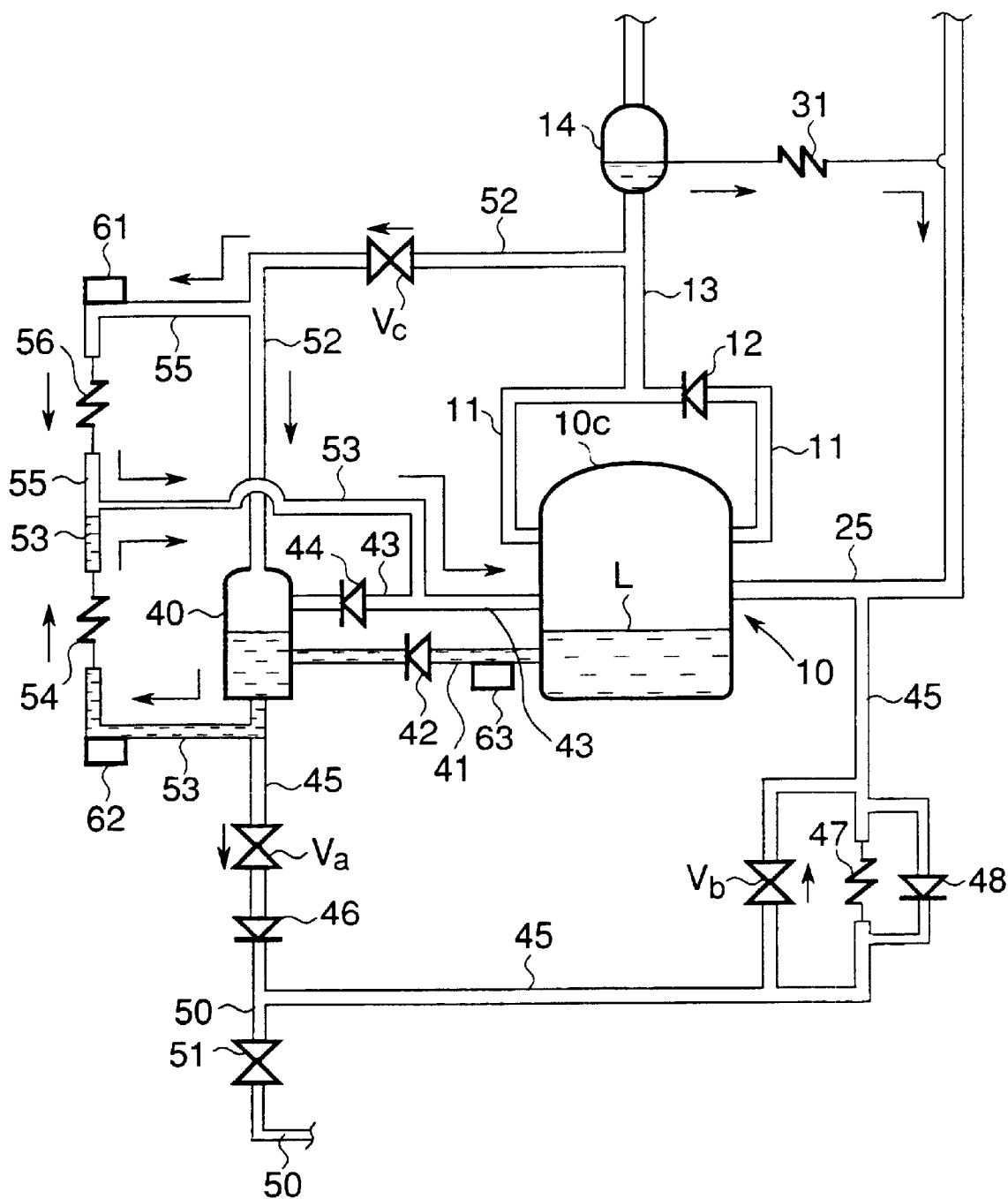
FIG. 2 is a view showing a structure of an oil amount detector in the first to a fifth embodiment.

In the multiple-type air conditioner having such a constitution, an oil amount detector is provided on the indoor unit 1 and each of the outdoor units 2 respectively. The oil amount detector detects the amount of lubrication oil in the case 10c of the compressor 10. A specific constitution of this oil amount detector is shown in FIG. 2.

Lubrication oil L is retained in the case 10c. An oil holding tank 40 is communicated to the case 10c via the oil traveling pipe 41, and a pressure balance pipe 43 respectively. The oil traveling pipe 41 is connected to a preset appropriate oil surface position of the case while the pressure balance pipe 43 is connected to a position above the appropriate oil surface position.

Pressure (a low pressure) in the case 10c and pressure in the oil holding tank 40 becomes the same through the pressure balance pipe 43 so that surplus portion of the lubrication oil L in the case 10c swiftly and smoothly moves to the oil holding tank 40 through the oil traveling pipe 41. Furthermore, since the oil traveling pipe 41 is connected to the appropriate oil surface position, the superfluous movement of the lubrication oil L from the case 10c to the oil holding tank 40 is prevented in advance when the oil surface in the case becomes not more than the appropriate oil surface.

In the oil movement pipe 41, a check valve 42 is provided for preventing the reverse flow of the oil to the case 10c from the oil holding tank 40. In the pressure balance pipe 43, a check valve 44 is provided for checking the inflow of the refrigerant from the oil holding tank 40 to the case 10c.

To the oil outflow port of the oil holding tank 40, one end of the oil recycling pipe 45 is connected, and the other end of the oil recycling pipe 45 is connected to the pipe 25. On this oil recycling pipe 45, an open and close valve Va, a check valve 46 for checking the reverse pressure (a pressure applied from the side of the oil recycling pipe 45 to the oil holding tank 40) from the case 10c, a capillary tube 47 are provided. Incidentally, an open and close valve Vb and a check valve 48 are connected in parallel respectively to the capillary tube 47.

Between the check valve 46 and the capillary tube 47 in the oil recycling pipe 45, the oil balance pipe 50 is connected via the packed valve 51.

A pressurizing pipe 52 is connected between the pipe 13 and the refrigerant inflow port of the oil holding tank 40. The pressurizing pipe 52 serves to introduce part of the refrigerant discharged from the compressor 10 to the oil holding tank 40 for use in pressurization for allowing the lubrication oil L to flow out from the oil holding tank 40. An open and close valve Vc is provided on this pressurization pipe 52.

One end of the return pipe 53 is communicated to the oil outflow port (one end portion of the oil recycling pipe 45) of the oil holding tank 40. The other end of the return pipe 53 is communicated to the case 10c via part of the pressure balance pipe 43. The return pipe 53 serves to allow the lubrication oil L to flowing out from the oil holding tank 40 to return to the case 10c. On this return pipe 53, a pressure reducer, namely, a capillary tube 54 is provided.

A bypass pipe 55 is connected from the halfway portion (on the downstream side of the valve Vc) of the pressure pipe 52 to the halfway portion (the downstream side of the capillary tube 54), and a pressure reducer, for example, a capillary tube 56 is provided. Even when the inflow amount of the refrigerant from the pressuring pipe 52 to the oil holding tank 40 is decreased, the refrigerant in the pressuring pipe 52 always flow via the bypass pipe 55. On this bypass pipe 55, a temperature sensor (a first temperature sensor) 61 is attached. The temperature sensor 61 detects the temperature TK1 of the refrigerant (gas) for pressurization.

On one end portion of the return pipe 53, a temperature sensor (a second temperature sensor) 62 is attached. The temperature sensor 62 detects the temperature TK2 of the lubrication oil L flowing out from the oil holding tank 40. A temperature sensor 63 is attached on the oil traveling pipe 41. The temperature sensor 63 detects the temperature TK3 of the lubrication oil L moving from the case 10c to the oil holding tank 40.

Figure 3:
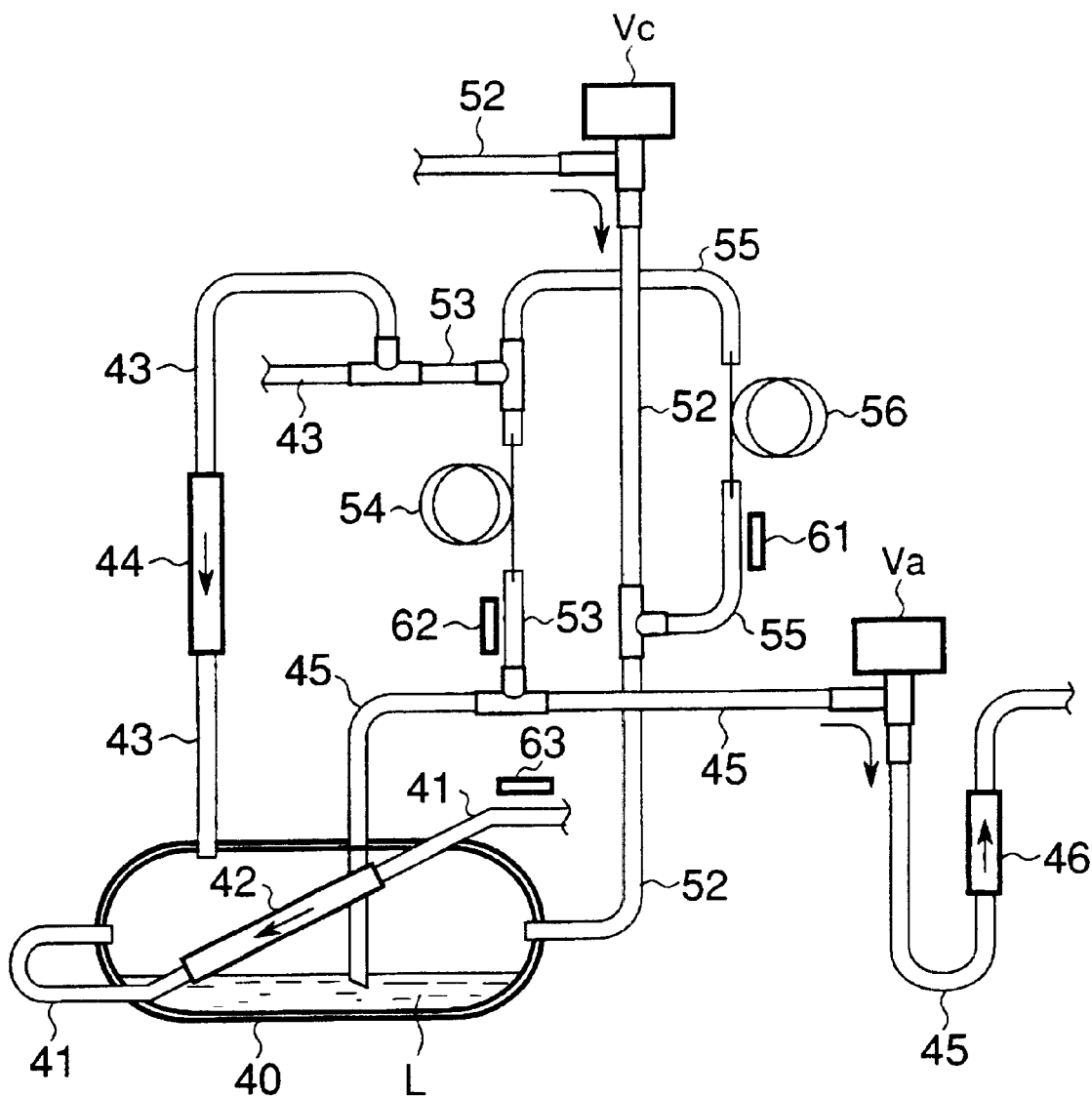
FIG. 3 is a view showing a specific example of a piping structure of an oil amount detector in the first to the fifth embodiment.

Incidentally, a specific example of the piping structure of the oil amount detector is shown in FIG. 3. In FIG. 3, like portions of FIG. 2 are denoted by like reference numerals.

Figure 4:
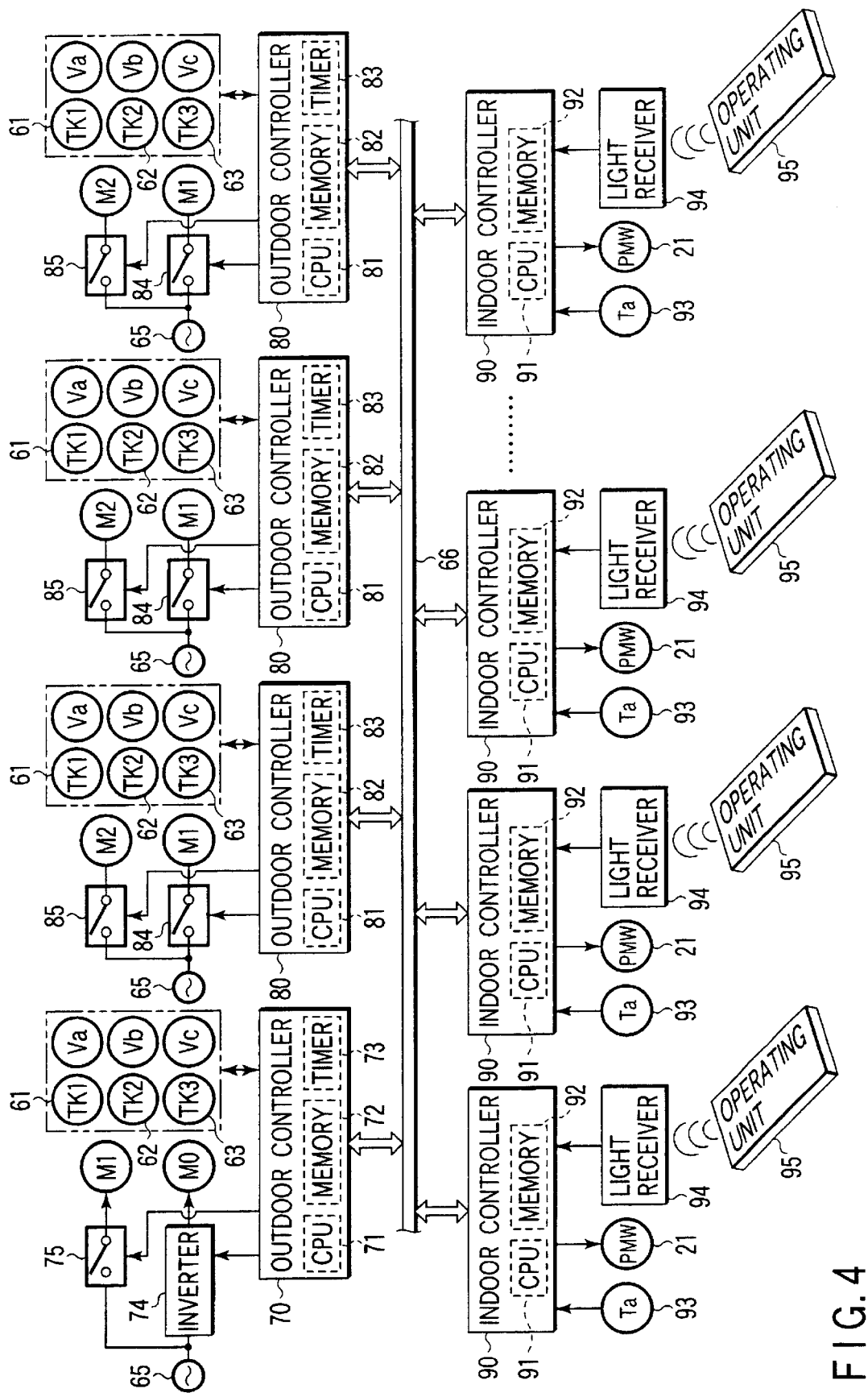
FIG. 4 is a bloc view showing a control circuit in the first to the fifth embodiment.

Furthermore, a control circuit of the whole air conditioner including the oil amount detector is shown in FIG. 4.

In FIG. 4, reference numeral 70 denotes an outdoor controller attached on the center outdoor unit 1. Reference numeral 80 denotes an outdoor controller attached on the terminal outdoor unit 2. Reference numeral 90 denotes an indoor controller attached on each of the indoor units 3. These outdoor controllers 70 and 80, and the indoor controllers 90 are mutually connected via the bus line 66 for data transmission.

The outdoor controller 70 generally controls the center indoor unit 1 and each of the outdoor units 2 in accordance with an instruction given from each of the indoor controllers 90. The outdoor controller 70 is provided with a CPU 71, a memory 72 for memorizing the control program and the data, and a timer 73 for counting time or the like.

In particular, the CPU 71, as one main function associated with the detection of oil amount, regularly opens the valve Vc of the pressuring pipe 52 in the state in which the valve Va of the oil recycling pipe 45 is closed during the operation of the compressor 10. The CPU 71 is provided with detection means for detecting an amount of lubrication oil L in the case 10c from a contrast between the detected temperature TK1 of the temperature sensor 61 and the detected temperature TK2 of the temperature sensor 62. Specifically from a difference between the detected temperature TK1 of the temperature sensor 61 and the detected temperature TK2 of the temperature sensor 62, the CPU 71 can detect the presence of the lubrication oil L in the oil holding tank 40 to determine as to whether or not the amount of the lubrication oil L in the case 10c is appropriate on the basis of the detection result.

To this outdoor controller 70, an inverter 74, an open and close switch 75, the valves Va, Vb and Vc and temperature sensors 61, 62 and 63 are connected. The inverter 74 converts a voltage of a commercial alternate current power source 65 into a direct current voltage, converts the direct current voltage into an alternate current voltage having a predetermined frequency and level in accordance with an instruction from the outdoor controller 70 by switching and outputs the alternate current voltage. The output is supplied as a drive power to the variable speed motor MO. Along with the change in the output frequency of the inverter 74, the revolution number of the variable speed motor MO changes. The switch 75 is inserted into the electrification channel between the power source 65 and the rated speed motor M1. When this switch 75 is turned on, the rated speed motor M1 is rotated at a definite speed. When the switch 75 is turned off, the operation of the rated speed motor M1 is suspended. That is, with the change in the revolution number of the variable speed motor MO, turning on and off of the operation of the rated speed motor M1, the capacity of the compressor 10 in the center outdoor unit 1 changes.

Each of the outdoor controllers 80 controls the terminal outdoor unit 2 in accordance with an instruction from the center outdoor unit 1, and is provided with a CPU 81, a memory 82 for memorizing control program and data or the like.

In particular, the CPU 81, as one main function associated with the detection of the oil amount, regularly opens the valve Vc of the pressuring pipe 52 in the state in which the valve Va of the oil recycling pipe 45 is closed during the operation of the compressor 10. The CPU 81 is provided with detection means for detecting the amount of lubrication oil L in the case 10c from a contrast between the detected temperature TK1 of the temperature sensor 61 and the detected temperature TK2 of the temperature sensor 62. Specifically, the CPU 81 regularly opens the valve Vc of the pressuring pipe 52, detects the presence of the lubrication oil L in the oil holding tank 40 from a difference between the detected temperature TK1 of the temperature sensor 61 and the detected temperature TK2 of the temperature sensor 62 to detect as to whether or not the amount of the lubrication oil L in the case 10c is appropriate or not on the basis of the result of the detection.

To these outdoor controller 80, an open and close switches 84 and 85, the valves Va, Vb and Vc, and temperature sensors 61, 62 and 63 are connected. The switch 84 are inserted into the electrification channel between the power source 65 and the rated speed motor M1. When this switch 84 is turned on, the rated speed motor M1 is operated with a definite revolution number. When the switch 84 is turned off, the operation of the rated speed motor M1 is suspended. The switch 85 is inserted into the electrification channel between the power source 65 and the rated speed motor M2. When the switch 85 is turned on, the rated speed motor M2 is operated at a definite revolution number. When the switch 85 is turned off, the operation of the rated speed motor M2 is suspended. That is, the capacity of the compressor 10 in the terminal outdoor unit 2 changes with the turning on and off of the operation of the rated speed motor M1 and M2.

Each of the indoor controller 90 controls the indoor unit 3, and has the CPU 91, and a memory 92 for memorizing a control program and data. The flow control valve 21, a light receiver 94, an indoor temperature sensor 93 for detecting the temperature Ta inside of the air conditioned chamber are connected to these indoor controller 90. The light receiver 94 receives the infrared ray light for setting operation conditions which are emitted from the remote control-type operating unit 95 to input the received data to the indoor controller 90. The operating unit 95 emits infrared ray light for setting various kinds of operation conditions such as ON and OFF of the operation, the operation modes (cooling, dehumidification, heating, and ventilation or the like) in accordance with the operation by the user.

Figure 5:
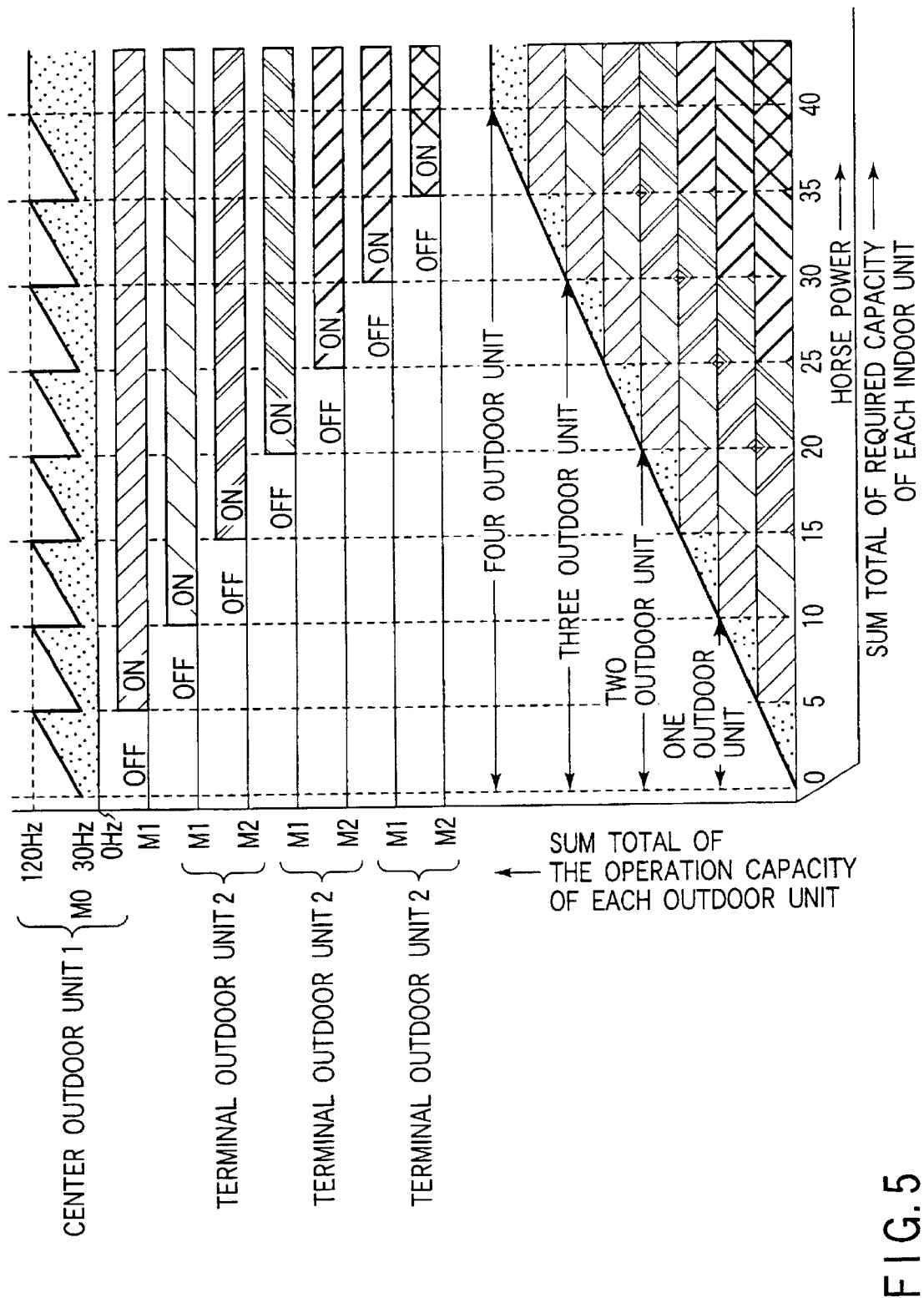
FIG. 5 is view showing a relation between a requirement capacity of each of the indoor unit and an operation capacity of the outdoor unit.

Hereinafter, an overall operation of the oil amount detector will be explained by referring to the flowchart of FIG. 5.

Each of the indoor units 3 determines as requirement capabilities (also referred to as air conditioning load) a difference between the set value Ts of the indoor temperature set by the operating unit 95 and the indoor temperature Ta detected with the indoor temperature sensor 93, controls the open degree of the flow control valve 21 in accordance with the requirement capability and at the same time, notifies the requirement capabilities and the operation mode to the center outdoor unit 1.

The center outdoor unit 1 controls the four-way valve 15 respectively in the center outdoor unit 1 and each of the terminal outdoor units 2 in accordance with the operation mode notified from each of the indoor units 3, and, at the same time, determines the sum total of the requirement capabilities notified from the each of the indoor units 3. The center outdoor unit 1 controls the sum total of the operation capacity (a capacity of each of the compressors 10) of the center outdoor unit 1 and each of the outdoor units 2. That is, the revolution number of the variable speed motor MO in the compressors 10 of the center outdoor unit 1 is conducted as a basis. In addition, the ON and OFF of the operation of the rated speed motors M1 and M2 in each of the compressors 10 (the number of operated motors) is controlled. For example, when the sum total of the requirement capability increases, the sum total of the operation capacity (the capacity of each of the compressors 10) is increased. When the sum total of the requirement capability decreases, the sum total of the requirement capability of the outdoor units 1 and 2 (the capacity of each of the compressors 10) is decreased.

Figure 6:
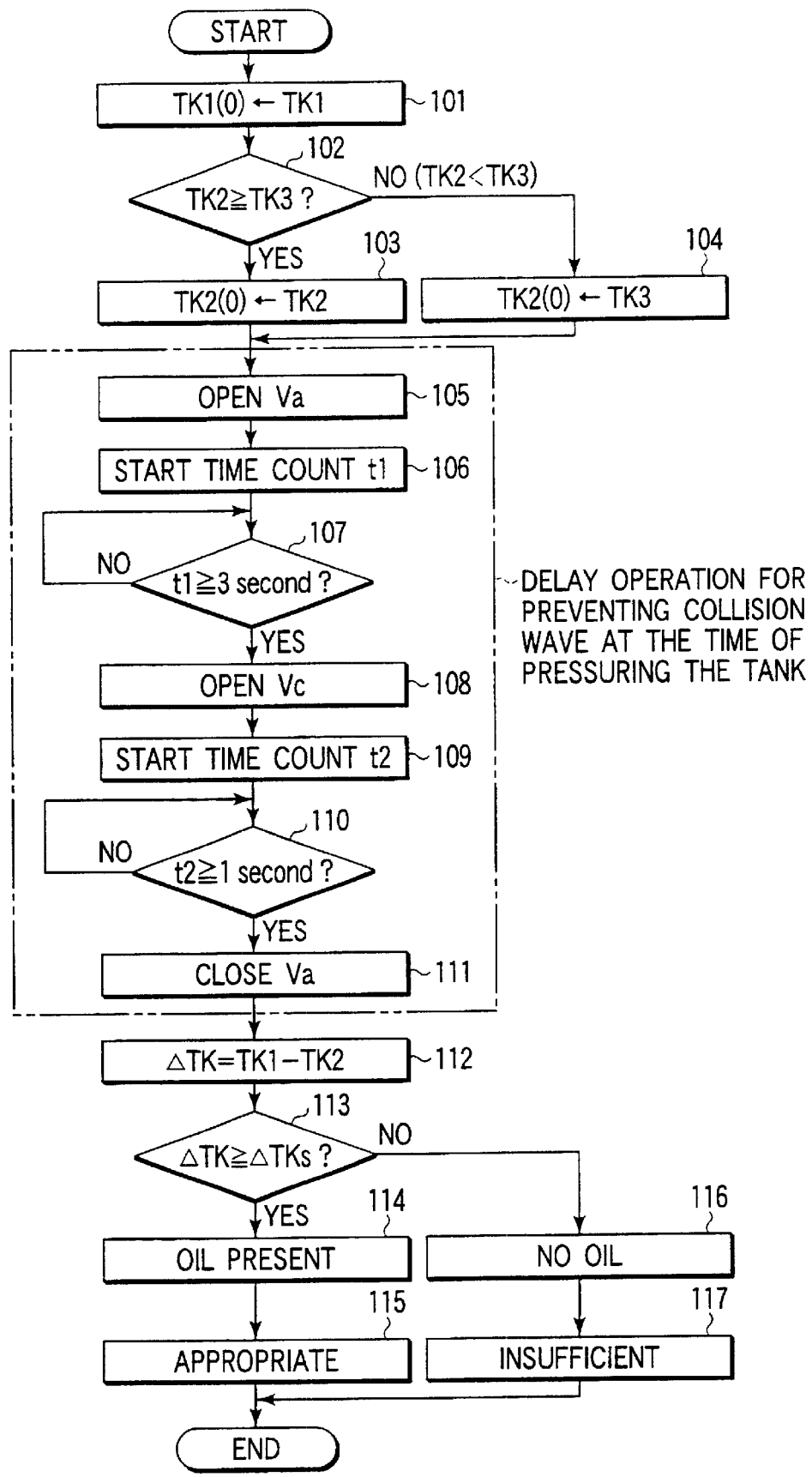
FIG. 6 is a flowchart for explaining an oil amount detection control in the first embodiment.

Next, an operation of the oil amount detector will be explained by referring to the flowchart of FIG. 6.

When the oil surface in the case 10c of the compressor 10 is higher than the connection position of the oil traveling pipe 41, the surplus lubrication oil L for the portion higher than the connection position moves to the oil holding tank 40 through the oil traveling pipe 41.

At the timing of the oil amount detection on the basis of the timing of timers 73 and 83 of each of the outdoor controllers 70 and 80, the detected temperature TK1 of the temperature sensor 61 is memorized as the initial value TK1(0) (step 101). When the detected temperature TK2 of the temperature sensor 62 is not less than the detected temperature TK3 of the temperature sensor 63 (YES at step 102), the detected temperature TK2 at that time is memorized as an initial value TK2(0) (step 103). When the detected temperature TK2 is lower than the detected temperature TK3 (NO at step 102), the detected temperature TK3 at that time is memorized as the initial value TK2(0) in place of the detected temperature TK2 (step 104).

Subsequently, the valve Va of the oil recycling pipe 45 is opened (step 105), and, at the same time, the time count t1 is started (step 106). When the valve Va is opened, the outflow port of the oil holding tank 40 is communicated to the pipe 25 through the oil recycling pipe 45.

When the time count t1 reaches three seconds (YES at step 107), the valve Vc of the pressuring pipe 52 is opened (step 108). At the same time, the time count t2 is started (step 109). Then, when the time count t2 reaches one second (YES at step 110), the Va is closed (step 111). Incidentally, here, the opening of the valve Va, the opening of the valve Vc after three seconds, and the closing of the valve Va after one second are delayed operation for preventing a collision wave to the check valves 42 and 44 at the time of tank pressuring.

A part of the refrigerant discharged from the compressor 10 by the opening of the valve Vc is charged into the oil holding tank 40. When the lubrication oil L is retained in the oil holding tank 40, the lubrication oil L is pressurized on the basis of the charging of the refrigerant, so that the lubrication oil L flows out from the outflow port of the oil holding tank 40. When the lubrication oil L is not retained in the oil holding tank 40, the charged refrigerant flows out from the outflow port of the oil holding tank 40 as it is. The lubrication oil L which flows out (and the refrigerant) flows into the case 10c through the oil recycling pipe 45, the return pipe 53 and the oil balance pipe 43.

At this time, the temperature TK1 of the refrigerant (the gas) charged into the oil holding tank 40 is detected with the temperature sensor 61, and the temperature TK2 of the fluid (the lubrication oil L and the refrigerant) flowing out from the oil holding tank 40 is detected with the temperature sensor 62. Then, a difference ΔTK between the two detected temperatures TK1 and TK2 is determined (step 112).

In the case where the lubrication oil L is retained in the oil holding tank 40, the rise of the detected temperature TK2 is delayed with respect to the rise of the detected temperature TK1. When the temperature difference ΔTK is equal to the set value ΔTKs or more (YES at step 113), it is judged that the lubrication oil L is retained in the oil holding tank 40 (step 114). On this basis, it is judged that the amount of the lubrication oil L in the case 10c is appropriate (step 115).

In the case where the lubrication oil L is not retained in the oil holding tank 40, the detected temperature TK2 follows the rise in the detected temperature TK1 and rises. The temperature difference ΔTK is less than the set value ΔTKs (NO at step 113), and it is judged that no lubrication oil L is retained in the oil holding tank 40 (step 116). On the basis of this judgment, it is judged that the amount of the lubrication oil L in the case 10c is insufficient (step 117).

When the result of the judgment as to whether the oil amount is appropriate or insufficient, or when the operation of the compressor 10 is suspended, or when an even oil control start instruction is given from the center indoor unit 1 in the case of the terminal outdoor unit 2, the detection termination operation is conducted.

That is, in the detection termination operation, the valve Va is opened while the valve Vc is opened. With the opening of the valve Va, pressure in the oil holding tank 40 is purged to the pipe 25 via the oil recycling pipe 45. After five seconds from the opening of the valve Va, the valve Vc is closed. After thirty seconds, the valve Va is closed.

When the result of the judgment that the oil amount is insufficient is obtained at the center outdoor unit 1, an even oil control start is instructed to all the terminal outdoor units 2 from the center outdoor unit 1. In each of the terminal outdoor units 2 where an even oil control start instruction is given, the valve Va is opened. With the opening of the each of the valves Va, each of the oil recycling pipe 45 is conducted, so that the lubrication oil L (a surplus portion thereof) retained in this oil holding tank 40 flows into the oil balance pipe 50.

In the center outdoor unit 1, the valve Vb is opened, the lubrication oil L which has flown from each of the terminal outdoor units 2 to the oil balance pipe 50 is taken into the pipe 25 on the side of sucking the refrigerant through the oil recycling pipe 45 and the valve Vb. Thus, the shortage of the lubrication oil L in the center indoor unit 1 is settled.

In the case where the result of the judgment that the oil amount is insufficient is obtained at any of each of the terminal outdoor units 2, the oil shortage is notified from the terminal outdoor unit 2 to the center outdoor unit 1. On the basis of the notification, the even oil control start instruction is given from the center outdoor unit 1 to all the other terminal outdoor units 2 excluding the terminal outdoor unit 2 in which the shortage of the oil amount is generated. At the center outdoor unit 1 and each of the terminal outdoor units 2 where the even oil control start instruction is received, the valve Va is opened. With the opening of each of the valve Va, each of the oil recycling pipe 45 is conducted, so that the lubrication oil L (a surplus portion thereof) retained in the oil holding tank 40 of the center outdoor unit 1 and each of the terminal outdoor units 2 flows to the oil balance pipe 50.

In the terminal outdoor unit 2 where the shortage of the oil amount is generated, the valve Vb is opened, and the lubrication oil L which has flown from the center indoor unit 1 and the other terminal outdoor units 2 to the oil balance pipe 50 is taken into the pipe 25 on the side of sucking the refrigerant through the oil recycling pipe 45 and the valve Vb. Thus, the shortage of the lubrication oil L of the compressor 10 in the terminal outdoor unit 2 is settled.

As described above, the oil holding tank 40 is communicated to the case 10c of the compressor 10, and a part of the refrigerant discharged from the compressor 10 is introduced to the oil holding tank 40 with the pressuring pipe 52, so that the lubrication oil L retained in the oil holding tank 40 is allowed to flow with the result that the temperature TK1 of the refrigerant introduced into the oil holding tank 40 is detected with the temperature sensor 61 while allowing the lubrication oil L which flows out to return to the case 10c from the return pipe 53 to the case 10c. At the same time, the temperature TK2 of the lubrication oil L flowing out from the oil holding tank 40 is detected with the temperature sensor 62. Thus, both detected temperatures TK1 and TK2 are compared with each other. As a consequence, the oil amount in the case 10c can be accurately detected in high reliability without using a mechanical float switch such as a conventional float switch type oil surface adjuster, without any worry about troubles, and without affecting the capacity and the configuration of the oil holding tank 40.

Since the lubrication oil L which flows out from the oil holding tank 40 is brought back to the case 10c through the return pipe 53 during the detection, no problem is generated even when the oil amount detection is repeated any number of times.

Since the oil holding tank 40 and the case 10c are communicated to each other with the traveling pipe 41 and the pressure balance pipe 43, the lubrication oil L in the case 10c can be allowed to swiftly and smoothly travel to each of the oil holding tank 40 as a surplus portion. Then, the surplus portion of the lubrication oil L stored in the compressor 10 where the shortage of the lubrication oil is detected can be refueled when needed or on a regular manner. That is, the shortage of the lubrication oil at each of the compressor 10 can be swiftly settled in a mutually compensating manner thereby largely contributing toward the improvement of the life of the compressor 10 and the reliability thereof.

Since the surplus portion of the lubrication oil L is constantly stored in an oil holding tank 40 different from the oil separator 14, an attempt can be made to decrease the capacity of the oil separator 14 and, in the end, reduce the size of the whole refrigeration apparatus.

[2] Second embodiment will be explained.

The CPU 71 of the outdoor controller 70, as one of the main functions of the detection of the oil amount, regularly opens the valve Va of the pressuring pipe 52 in the state in which the valve Va of the oil recycling pipe 45 is closed during the operation of the compressor 10, and the CPU 71 is provided with detection means for detecting the amount of the lubrication oil L in the case 10c from a contrast between the detected temperature TK1 of the temperature sensor 61 when opened and the detected temperature TK2 of the temperature sensor 62. Specifically, the CPU 71 detects a substantial amount of the lubrication oil L in the oil holding tank 40 despite a mixture of a liquid refrigerant on the basis of the change with the lapse of time of a difference between the detected temperature TK1 of the temperature sensor 61 and the detected temperature TK2 of the temperature sensor 62 to detect whether or not the amount of the lubrication oil L in the case 10c is appropriate on the basis of the detection result. In short, the CPU 71 detects time tn from the rise of the detected temperature TK1 up to the rise of the detected temperature sensor TK2, so that the CPU 71 detects the substantial amount of the lubrication oil L in the oil holding tank 40 despite the mixture of the liquid refrigerant to detect whether or not the amount of the lubrication oil L in the case 10c is appropriate on the basis of the result of detection.

The CPU 81 of each of the outdoor control portion 80, as one of the main functions associated with the detection of the oil amount, regularly opens the valve Vc of the pressuring pipe 52 in the state in which the valve Va of the oil recycling pipe 45 is closed during the operation of the compressor 10, and the CPU 81 is provided with detection means for detecting the amount of lubrication oil L from a contrast between the detected temperature TK1 of the temperature sensor 61 when opened and the detected temperature TK2 of the temperature sensor 62. Specifically, the CPU 81 regularly opens the valve Vc of the pressuring pipe 52, and detects the substantial amount of the lubrication oil L in the oil holding tank 40 on the basis of the change with the lapse of time of a difference between the detected temperature TK1 of the temperature sensor 61 and the detected temperature TK2 of the temperature sensor 62 to detect whether or not the amount of the lubrication oil L is appropriate. In short, the detection means detects time tn from the rise of the detected temperature TK1 up to the rise of the detected temperature TK2, detects the substantial amount of the lubrication oil L in the oil holding tank 40 from a comparison between the detected time tn and the set value tns, and detects whether or not the amount of the lubrication oil L in the case 10c on the basis of the detection result.

Other structures are the same as the first embodiment, and an explanation thereof will be omitted.

Figure 7A:
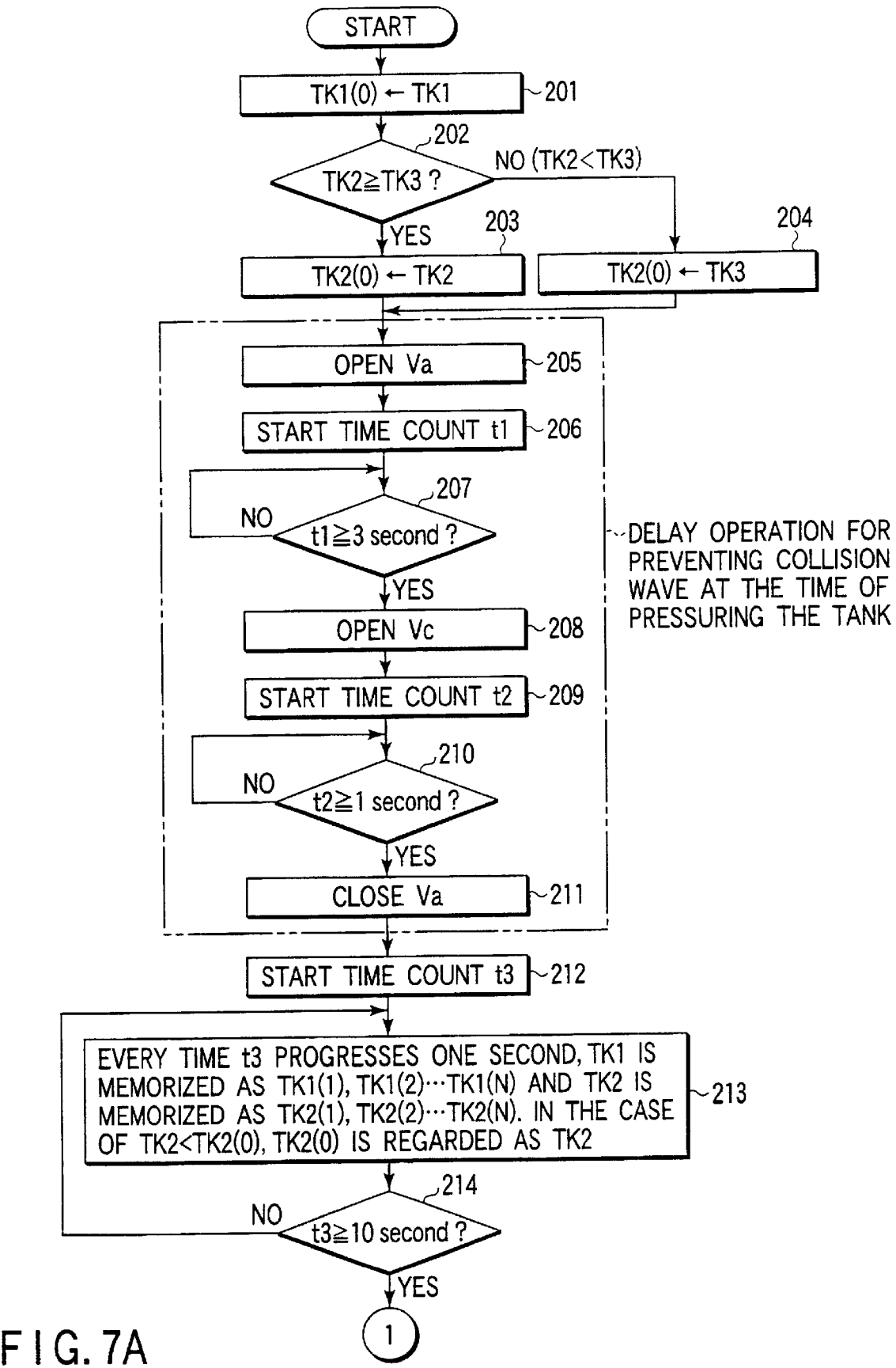
FIGS. 7A and 7B are flowcharts for explaining the oil amount detection control in a second embodiment.
Figure 7B:
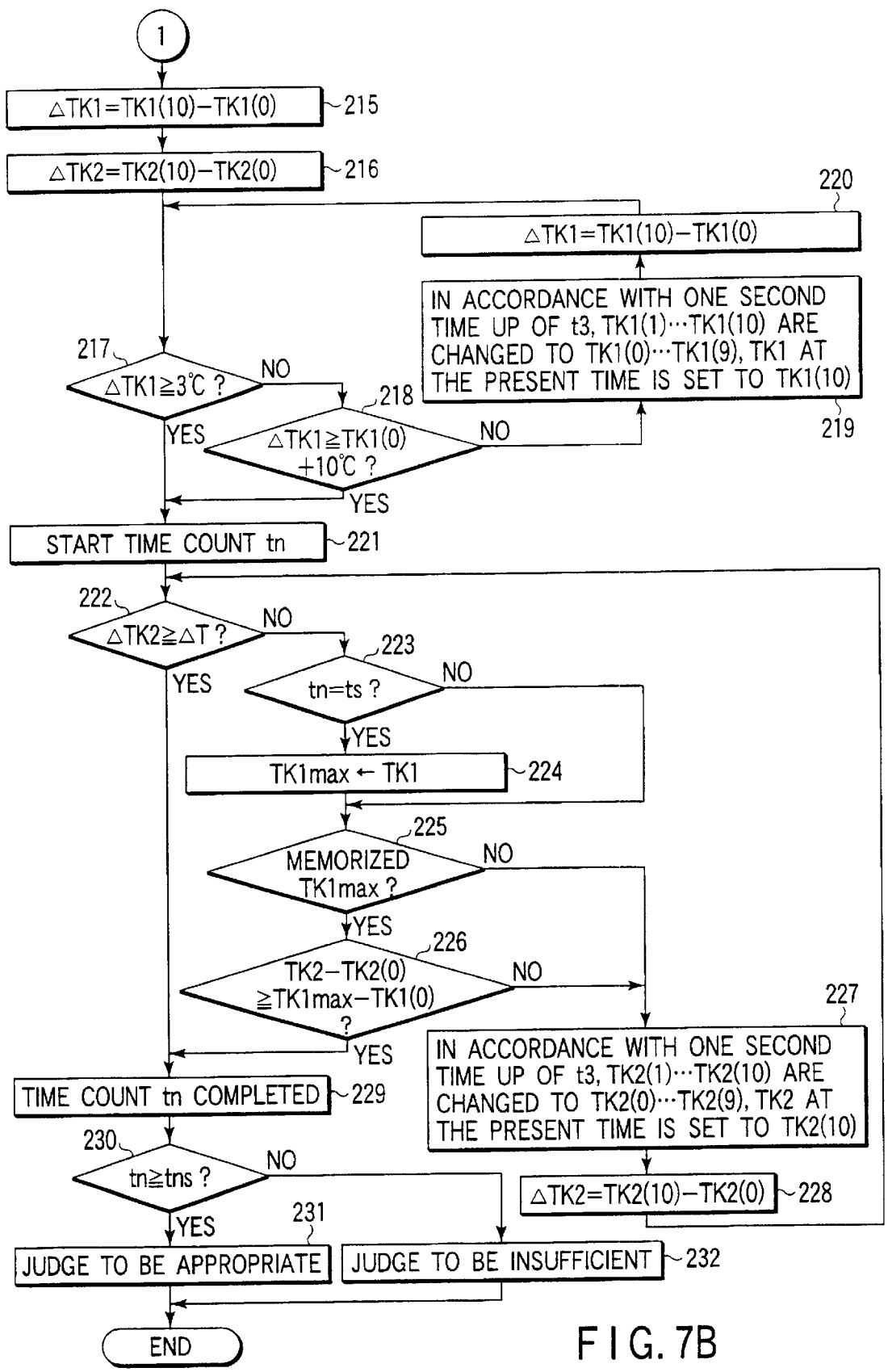

An operation of the oil amount detector will be explained by referring to the flowchart of FIGS. 7A, 7B and 8.

At the timing of the regular oil amount detection, the detected temperature TK1 of the temperature sensor 1 is memorized as an initial value TK2(0) (step 201). When the detected temperature TK2 of the temperature sensor 62 is not less than the detected temperature TK3 of the temperature sensor 63 (YES at step 202), the detected temperature at that time is memorized as the initial value TK2(0) (step 203). When the detected temperature TK2 is lower than the detected temperature TK3 (NO at step 202), the detected temperature TK3 at that time is memorized as the initial value TK2(0) in the place of the detected temperature TK2 (step 204)

Subsequently, the valve Va of the oil recycling pipe 45 is opened (step 205), and, at the same time, the time count t1 is started at the same time (step 206). When the valve Va is opened, the oil outflow port of the oil holding tank 40 is communicated to the pipe 25 on the side of sucking the refrigerant through the oil recycling pipe 45.

When the time count t1 reached three seconds (YES at step 207), the valve Vc of the pressuring pipe 52 is opened (step 208), and, at the same time, the time count t2 is started at the same time (step 209). Then, when the time count t2 reaches one second (YES at step 210), the valve Va is closed (step 211). Incidentally, the opening of the valve Va, the opening of the valve Vc after three seconds, and the closing of the valve Va after one second are a delay operation for preventing the collision wave against the check valves 42 and 44 at the time of pressuring the tank.

With the opening of the valve Vc, a part of the refrigerant discharged from the compressor 10 is charged into the oil holding tank 40. When the lubrication oil L is retained in the oil holding tank 40, the lubrication oil L receives a pressuring action on the basis of the charging of the refrigerant to flow out from the oil outflow port of the oil holding tank 40. When the lubrication oil L is retained in the oil holding tank 40, the lubrication oil L receives the pressuring action on the basis of the charging of the refrigerant to flow out from the outflow port of the oil holding tank 40. When the lubrication oil L is not retained in the oil holding tank 40, the charged refrigerant flows out from the outflow port of the oil holding tank 40 as it is. The flowing out lubrication oil L (and the refrigerant) flows into the case 10c through the oil recycling pipe 45, the return pipe 53 and the oil balance pipe 43.

At this time, the temperature TK1 of the refrigerant (gas) charged into the oil holding tank 40 is detected with the temperature sensor 61, and the temperature TK2 of the fluid (the lubrication oil L and the refrigerant) flowing out from the oil holding tank 40 is detected with the temperature sensor 62.

Figure 8:
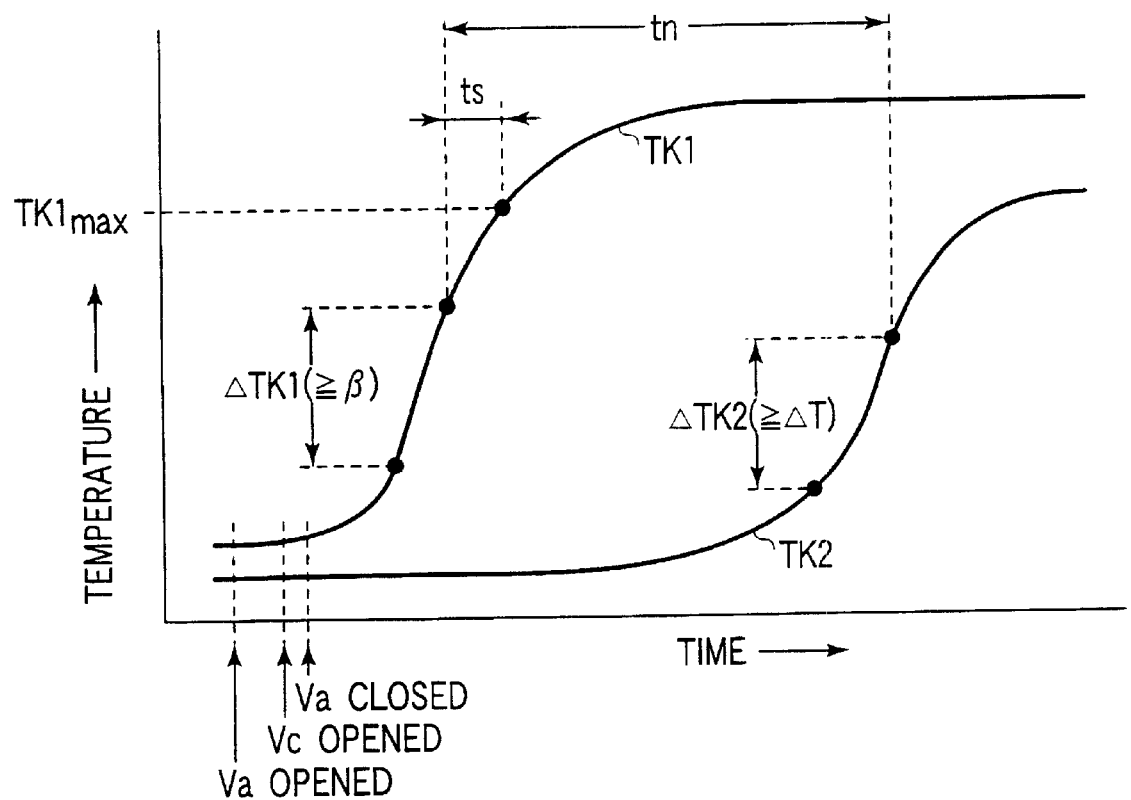
FIG. 8 is a view showing an example of change in the detected temperatures TK1 and TK2 in the second embodiment.

In the case where the lubrication oil L is retained in the oil holding tank 40, as shown in FIG. 8, the detected temperature TK1 rises and increases in the beginning. Then, when the detected temperature TK1 is stabilized, the detected temperature TK2 rises and increases this time, and soon the detected temperature TK2 is also stabilized. That is, a difference between the detected temperature TK1 and the detected temperature TK2 once changes to an increasing direction and soon gradually begins to decrease.

Here, time required from the rise of the detected temperature TK1 up to the rise of the detected temperature TK2 corresponds to a substantial amount of the lubrication oil L in the oil holding tank 40 irrespective of whether or not a liquid refrigerant is mixed with the lubrication oil L.

After the valve Va at step 212 is opened, the time count t3 is started (step 212). When the time count t3 proceeds one second, the detected temperature TK1, and the detected temperature TK2 at that time are memorized as TK1(1) and TK1(2). When the time count t3 proceeds another one second, the detected temperature TK1 and TK2 are memorized as TK1(1) and TK2(2) respectively. In this manner, every time the time count t3 proceed one second, the detected temperature TK1 is memorized as TK1(1), TK1(2), . . . TK1(n) subsequently. At the same time, the detected temperature TK2 is memorized as TK2(1), TK2(2), . . . TK2(n) in order (step 213). Incidentally, when the detected temperature TK2 is lower than the initial value TK2(0), the initial value TK2(0) is adopted as the detected temperature TK2.

When the time count t3 reaches ten seconds (YES at step 214), the change amount $\Delta TK1[=TK1(10)-TK1(0)]$ of the detected temperature TK1 for ten seconds up to that time is determined (step 215), and at the same time, the change amount $\Delta TK2[=TK2(10)-TK2(0)]$ of the detected temperature TK2 for ten seconds is determined in the same manner (step 216).

It is judged whether or not the determined change amount $\Delta TK1$ becomes equal to the predetermined value β (for example 3° C.) or more (step 217). The judgment is made to detect the rise of the detected temperature TK1. Furthermore, it is judged whether or not the detected temperature TK1 becomes higher than the initial value TK1(0) by a predetermined value α (for example 10° C.). (In other words, whether or not the change amount from the initial value TK1(0) of the detected temperature TK1 becomes equal to the predetermined value α or more (step 218). The judgment is made to detect the rise of the detected temperature TK1.

In the case where the judgment at steps 217 and 218 are both denied (NO), processing is conducted to determine the most recent change amount $\Delta TK1$ for the new ten seconds up to the present time in accordance with one second up of the time count t3. That is, in accordance with one second up of the time count t3, the memorized TK1(1), TK1(2), . . . TK1(10) are renewed and memorized as TK1(0), TK(1), . . . TK1(9), so that the detected temperature TK1 at the present time is renewed and memorized as TK(10) (step 219). Then, here, on the basis of the renewed TK1(0), TK1(1), TK1(2), . . . TK1(10), the change amount $\Delta TK1$ [=TK1 (10)−TK1(0)] of the detected temperature TK1 in another ten seconds up to the present-time is determined (step 220).

This is a processing for renewing the change amount $\Delta TK1$ for ten seconds for each one second. The processing is repeatedly conducted in the case where both judgments at steps 217 and 218 are denied (NO).

In the case where one of the judgments at steps 217 and 218 is affirmed (YES) (a rise detection timing of the detected temperature TK1), the time count tn is started (step 221).

Subsequently, it is judged whether or not the determined change amount $\Delta T$ becomes equal to the predetermined value or more (step 222). The judgment is made to detect the rise of the detected temperature TK2.

When the time count tn reaches the set value ts (YES at step 223) in the case where the judgment at step 222 is denied (NO), the detected temperature TK1 at that time is memorized as TK1max (step 224).

Before the time count tn reaches the set value ts (NO at step 223), processing is conducted to determine the most recent change amount ΔTK for new ten seconds up to the present time in accordance with one second count up of the time count t3 under the judgment that TL1max is not memorized (NO at step 225). That is, in accordance with one second count up of the time count t3, the memorized TK2(1), TK2(2), . . . TK2(10) are renewed and memorized as TK2(0), TK2(1), . . . TK2(9), so that the detected temperature TK2 at the present time is renewed and memorized at TK2(10) (step 227). Then, on the basis of the renewed TK2(0), TK2(1), TK2(2), . . . TK2(10), the change amount ΔTK2 [=TK2(10)−TK2(0)] of the detected temperature for new ten seconds up to the present time is determined (step 228).

This is a processing for renewing the change amount ΔTK2 for ten seconds for every one second. In the case where the judgment at step 222 is denied (NO), the processing is repeated and conducted.

Since the TK1max is already memorized (YES at step 225) after the time count tn exceeds the set value ts (NO at step 223), it is judged at to whether the change amount [=TK2−TK2(0)] from the initial value Tk2(0) of the detected temperature TK2 becomes equal to a difference [=TK1−TK1(0)] between the initial value TK1(0) of the detected temperature TK1 and the TK1max (step 226). This judgment is to detect the rise of the detected temperature TK2.

When the judgment at step 226 is denied (NO), the processing at steps 227 and 228 (the processing for renewing the change amount ΔTK2 for ten seconds for each second) is repeated and conducted.

In the case where one of the judgment at steps 227 and 228 for detecting the rise of the detected temperature TK2 is affirmed (YES) (a rise detection timing of the detected temperature TK2), the time count tn is completed (step 229). The time count tn up to the time is time from the rise of the detected temperature TK1 up to the rise of the detected temperature TK2, and the time count tn stands proportional to the substantial amount of the lubrication oil L in the oil holding tank 40. The time count tn and the set value tns are compared (step 230).

When the time count tn is equal to the set value tns or more (YES at step 230), it is judged that the amount of the lubrication oil L in the case 10c is appropriate (step 231). When the time count tn is less than the set value tns (NO at step 230), it is judged that the amount of the lubrication oil L in the case 10c is insufficient (step 232).

Incidentally, the set values ts, the predetermined value ΔT and the set value tns are variably set by using as a parameter a compression ratio Px (=a pressure on the high pressure side Pd/a pressure on the low pressure side Ps) of the refrigerant in the compressor 10 or a difference between the pressure on the high pressure side Pd and the pressure on the low pressure side Ps, and using as a parameter a difference in the operation mode (a cooling operation or a heating operation). This variable setting table is stored in the memories 73 and 83 of each of the outdoor controllers 70 and 80. For example, with respect to the predetermined value ΔT, when the compression ratio Px becomes larger, or when a difference between the pressure Pd on the high pressure side and the pressure Ps on the low pressures side is larger, a high value is set.

The processing after the result of judgment is obtained as to whether the oil amount is appropriate or insufficient is the same as the first embodiment, and an explanation thereof is omitted.

As described above, the oil holding tank 40 is communicated to the case 10c of the compressor 10, and part of the refrigerant discharged from the compressor. 10 is introduced into the oil holding tank 40 from the pressuring pipe 52 with the result that the lubrication oil L retained in the oil holding tank 40 is flown out, and the temperature TK1 of the refrigerant introduced to the oil holding tank 40 is detected with the temperature sensor 61, and, at the same time, the temperature TK2 of the lubrication oil L which flows out from the oil holding tank 40 is detected with the temperature sensor 62, and the oil amount in the case 10 can be accurately detected in a high reliability without using a mechanical float switch such as a conventional float switch type oil surface adjuster by contrasting the detected temperature TK1 and TK2 without any worry about trouble, without any influence exerted from the capacity and the configuration of the oil holding tank 40 by appropriately defining the set value tns with respect to the time count tn while bringing back the lubrication oil L which flows out to the case 10c of the return pipe 53. In particular, even when a liquid refrigerant is mixed with the lubrication oil L in the case 10c, a substantial amount of the lubrication oil L in the case 10c can be accurately detected without being affected by the mixture of the liquid refrigerant.

Since the lubrication oil L flowing out from the oil holding tank 40 during the detection returns to the case 10c through the return pipe 53, no problem is generated even when the oil amount detection is repeated any of times.

Since the oil holding tank 40 and the case 10c are communicated to each other with the traveling pipe 41 and the pressure balance pipe 43, the lubrication oil L in the case 10c can swiftly and smoothly travel to the oil holding tank 40 as a surplus portion. In this manner, a surplus portion of the lubrication oil L stored in the oil holding tank 40 can be refueled in the compressor 10 in which the shortage of the lubrication oil L is detected when needed or on a regular basis. That is, the shortage of the lubrication oil L in each of the compressor 10 can be swiftly settled in a mutually compensating manner, which can largely contribute toward the improvement of life of the compressor 10 and the improvement of the reliability thereof.

Since the surplus portion of the lubrication oil L is constantly stored in an oil holding tank 40 different from the oil separator 14, an attempt can be made to decrease the capacity of the oil separator 14 and a contribution can be made toward the size reduction of the whole refrigeration apparatus.

[3] A third embodiment will be explained hereinbelow.

An overall structure of the third embodiment is the same as the first embodiment. A function of oil amount detection is the same as the second embodiment, and an explanation thereof is omitted here.

Figure 9:
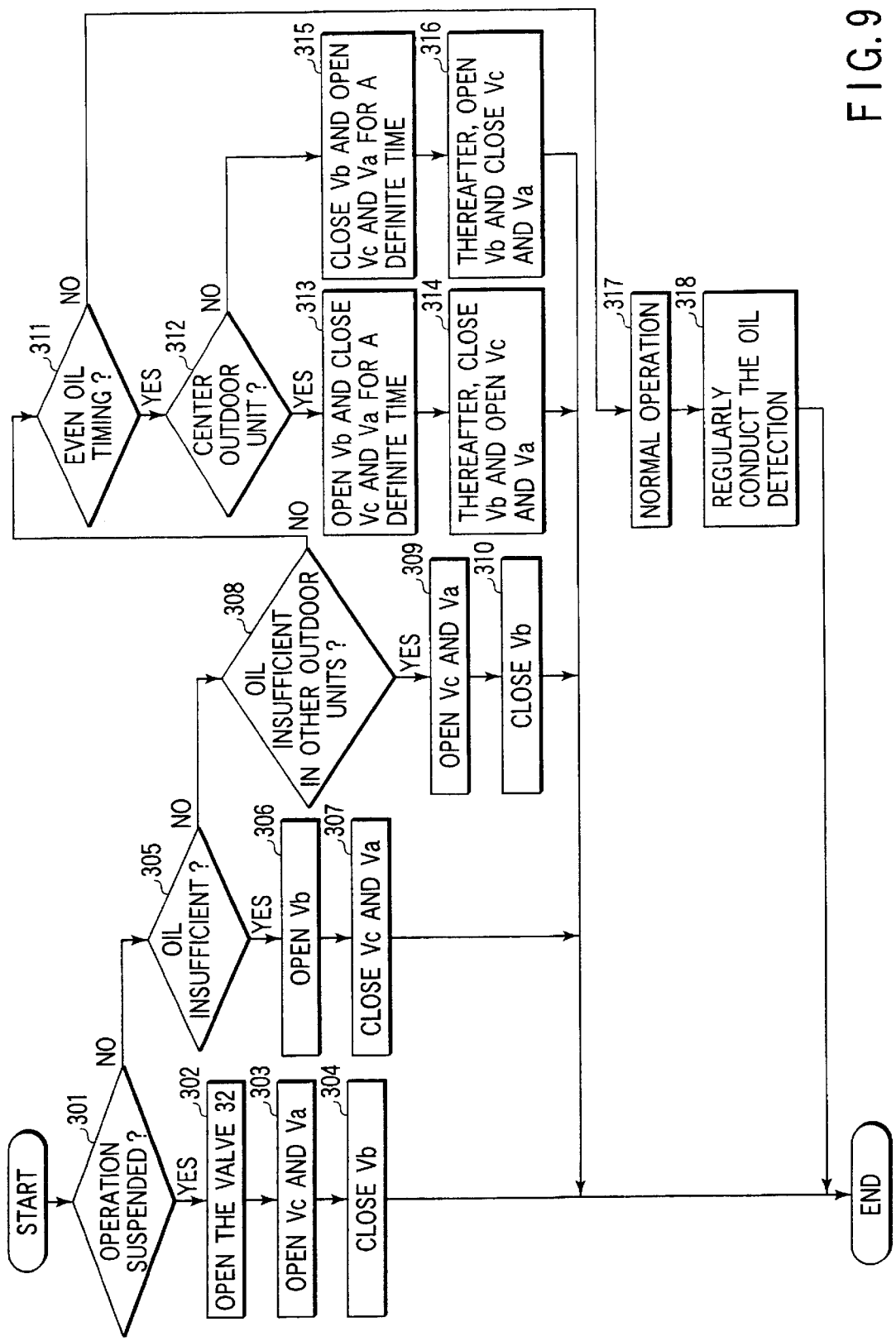
FIG. 9 is a flowchart for explaining a control of a third embodiment.

An operation of each of the outdoor units 1 and 2 will be explained by referring to the flowchart of FIG. 9.

When the oil surface in the case 10c of the compressor 10 is higher than the connection position of the traveling pipe 41, the lubrication oil L for the portion higher than the connection position travels to the oil holding tank 40 through the traveling pipe 41.

When the operation of any of the outdoor units 1 and 2 (YES at step 301) is suspended, the release bypass open and close valve 32 is opened (step 302), and, at the same time, the valves Vc and Va are opened (step 303). The valve Vb remains closed (step 304).

When the valve 32 is opened, a pressure balance between the piping on the high pressure side and the piping on the low pressure side progresses through the release bypass. The pressure on the high pressure side is applied to the oil holding tank 40 through the valve Vc, and the lubrication oil L in the oil holding tank 40 flows out to the oil recycling pipe 45. The lubrication oil L which flows out flows to the oil balance pipe 50 through the valve Va.

The sucking pressure of the compressor 10 in the outdoor unit which is being operated is applied to the oil balance pipe 50 through the pipe 25 on the side of sucking the refrigerant and the oil recycling pipe 45. Consequently, the lubrication oil L which has flown to the oil balance pipe 50 flows into the oil recycling pipe 45 in the outdoor unit which is being operated, and the lubrication oil L is sucked into the compressor 10 through the capillary tube 47 and the pipe 25 on the side of sucking the refrigerant.

The state in which the lubrication oil L flows from the suspended terminal outdoor units 2 to the center outdoor unit 1 and the terminal outdoor unit 2 which are operated in the case where the operation of any of the terminal outdoor unit 2 is suspended and the remaining terminal outdoor unit 2 is operated while the center outdoor unit 1 is being operated is shown by an arrow in FIG. 1. In an example of FIG. 1, the operation of the third terminal outdoor unit 2 from the right is suspended, and the other outdoor units 1 and 2 are being operated.

In this manner, the shortage of the lubrication oil L in the outdoor unit is prevented by controlling the conduction of each of the pressuring pipe 52 and the oil recycling pipe 45 so that the surplus portion of the lubrication oil L which is retained in the suspended outdoor unit flows to the outdoor unit which is operated.

On the other hand, the oil amount of the compressor 10 in each of the indoor units 1 and 2 is detected with the oil amount detector in the same manner as the second embodiment.

When the shortage of the lubrication oil L is detected in any of the compressors 1 and 2 (YES at step 305), the valve Vb is opened in the outdoor unit in which the shortage of the lubrication oil L is generated (step 306). The valve Vb remains open (step 307).

The generation of the shortage of the lubrication oil L is notified to the center outdoor unit 1, and, at the same time, the generation is also notified from the center outdoor unit 1 to the other terminal outdoor unit 2.

At the outdoor unit to which the shortage of the lubrication oil L at the other outdoor unit is notified (YES at step 308), the valves Vc and Va are opened (step 309). The valve Vb is closed (step 310). In this manner, the lubrication oil L in the oil holding tank 40 flows out to the oil recycling pipe 45 by the opening of the valves Vc and Va. The lubrication oil L passes through the valve Va to flow to the oil balance pipe 50.

The sucking pressure of the compressor 10 in the outdoor unit in which the lubrication oil L is insufficient is applied to the oil balance pipe 50 through the pipe 25 and the oil recycling pipe 45. Consequently, the lubrication oil L which has flown to the oil balance pipe 50 flows into the oil recycling pipe 45 in the outdoor unit where the oil lubrication oil L is insufficient, and is sucked into the compressor 10 through the valve Vb and the pipe 25 on the side of the side of sucking the refrigerant.

Figure 10:
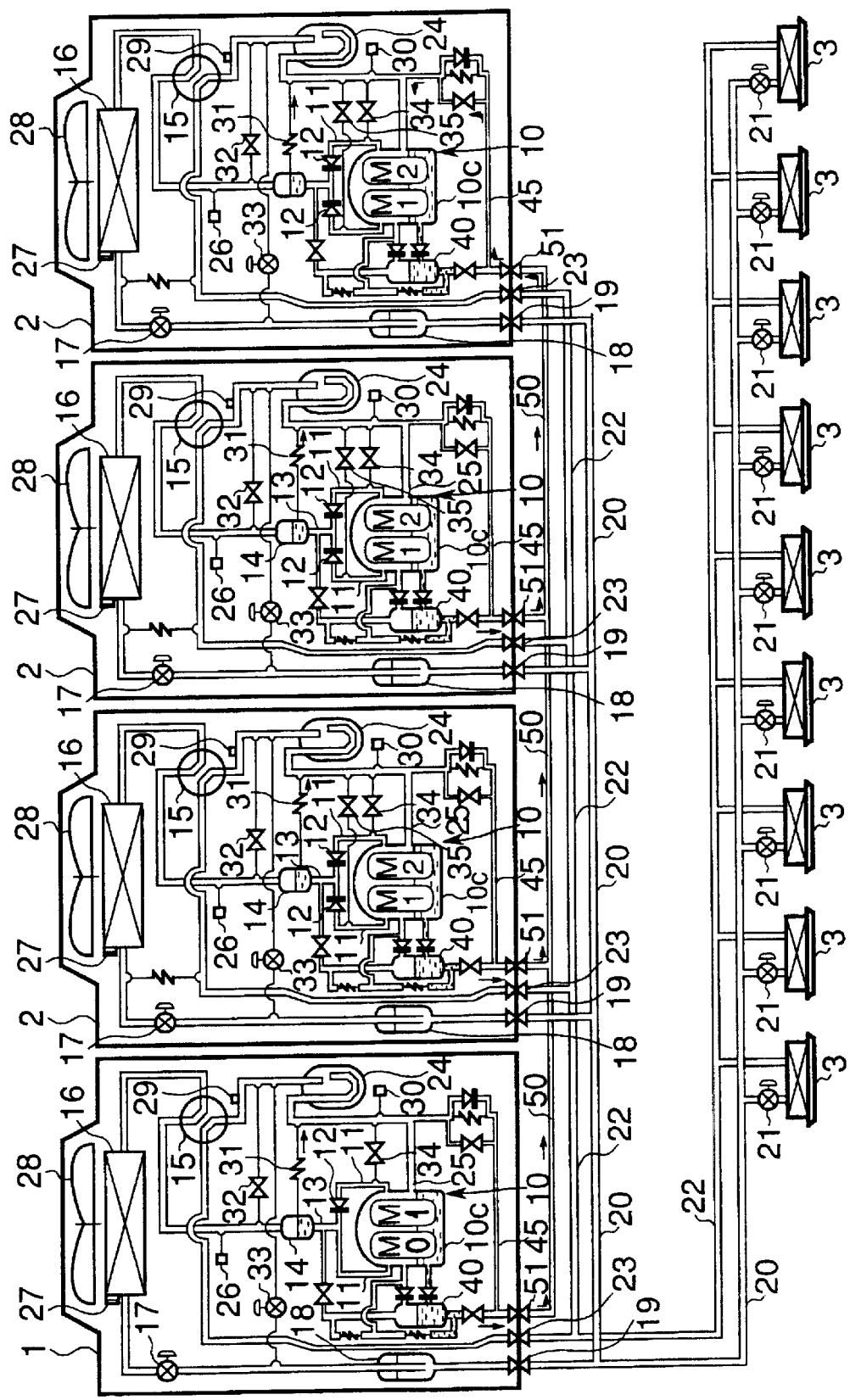
FIG. 10 is a view showing an example of a flow of the refrigerant and the lubrication oil in the third embodiment.

The flow of the lubrication oil L in the case where the shortage of the lubrication oil L is generated in one of the terminal outdoor units 2 is denoted by an arrow in FIG. 10. The lubrication oil L is insufficient in the outdoor unit 2 on the right end, and the surplus portion of the lubrication oil L from the other terminal outdoor unit 2 and the center outdoor unit 1 is refueled.

In this manner, the shortage of the lubrication oil L is swiftly settled by the control of the conduction of each of the oil pressuring pipe 52 and each of the oil recycling pipe 45 so that the lubrication oil L in the oil holding tank 40 flows to one of each of the terminal outdoor unit 2 in which the shortage of the lubrication oil L is detected.

Furthermore, in the case where an appropriate balance state of the oil amount between respective outdoor units 1 and 2 continues at the regular even oil timing on the basis of the time counting of the timer 73 of each of the outdoor control unit 70 (YES at step 311), specifically the conduction of each of the pressuring pipes 52 and each of the oil recycling pipes 45 are controlled in such a manner that the oil retained in the each of the terminal outdoor units 2 on the side of the low operation rate is once collected in the center outdoor unit I on the side on which the operation ratio is high and the collected oil is allowed to return to each of the terminal outdoor units 2. Since the center outdoor unit 1 is a type which is constantly inverter driven, the operation ratio thereof is higher than the terminal outdoor unit 2.

That is, in the center outdoor unit 1 (YES at step 312), the valve Vb is opened for a definite time while the valves Vc and Va are closed (step 313). After that, the valve Vb is closed, and the valves Vc and Va are opened (step 314). In each of the outdoor terminal outdoor units 2 (NO at step 312), the valve Vb is closed for a definite time and the valves Vc and Va are opened (step 315). After that, the valve Vb is opened, and the valves Vc and Va are closed (step 316).

For a definite time during which the valves Vc and Va of each of the terminal outdoor units 2 are opened, the lubrication oil L flows out from the oil holding tank 40 of each of the terminal outdoor units 1 to flow to the oil balance pipe 50. At this time, since the valve Vb of the center unit 1 is opened and the sucking force of the compressor 10 in the center outdoor unit 2 is applied to the oil balance pipe 50, the lubrication oil L in the oil balance pipe 50 is sucked into the compressor 10 of the terminal outdoor unit 2.

After the lapse of a definite time, the lubrication oil L flows out from the oil holding tank 40 of the center outdoor unit 1 by the opening of the valve Vc and Va of the center outdoor unit 1, so that the lubrication oil L flows to the oil balance pipe 50. At this time, the valve Vb of the terminal outdoor unit 2 is opened, and the sucking force of the compressor 10 in the terminal outdoor unit 2 is applied to the oil balance pipe 50 with the result that the lubrication oil L in the oil balance pipe 50 is sucked into the compressor 10 of the terminal outdoor unit 2.

In this manner, the deviation in the return of the lubrication oil L generated along with the progress of the operation can be compensated by the execution of the control of the oil amount balance control which moves the surplus portion of the lubrication oil L mutually between respective outdoor units 1 and 2.

When the judgment at steps 301, 305, 308 and 311 are denied (NO), the normal operation is conducted (step 317). The detection of the oil amount is regularly conducted for detecting whether or not the lubrication oil L is appropriate or sufficient (step 318).

As described above, the shortage of the lubrication oil L in each of the compressors 10 can be settled in a mutually compensating and swift manner thereby largely contributing toward the improvement of the.life of the compressor 10 and the improvement of the reliability thereof.

Since a surplus portion of the lubrication oil L is constantly stored in the oil holding tank 40 different from the oil separator 14, an attempt can be made to decrease the capacity of the oil separator 14 and to decrease the size of the whole refrigeration apparatus.

Incidentally, in the third embodiment, the oil amount of the each of the compressors 10 having the oil holding tank 40 as constituent elements is detected by using the oil amount detector. Other devices such as a float switch style oil amount detector or the like may be used.

[4] A fourth embodiment will be explained.

An overall structure is the same as the first embodiment. The function of the oil amount detection is the same as the second embodiment, and an explanation thereof will be omitted.

In the case where the outdoor units 1 and 2 are set to the heating mode, frost is gradually deposited on the surface of each of the outdoor heat exchanger 16 which functions as an vaporizer with the result that the heat exchange amount of the outdoor heat exchanger 16 is decreased and the heating efficiency is lowered. In order to prevent such disadvantage, a defrosting operation or a reverse cycle defrosting operation with respect to each of the heat exchangers 16 is conducted on a regular basis or when needed on the basis of the temperature detection of the heat exchanger.

That is, in the defrosting operation, the refrigerant flow of each heat pump style cooling cycle is changed over in a reverse direction with a four-way valve 15. Through the formation of the defrosting mode (same as the refrigerant flow in the cooling mode), a high temperature gas refrigerant discharged from each of the compressors 10 is directly supplied to each of the outdoor heat exchanger 16 via each of the four-way valves 15. The frost deposited on the surface of each of the outdoor heat exchanger 16 is dissolved upon receiving heat of the high temperature refrigerant.

Figure 11:
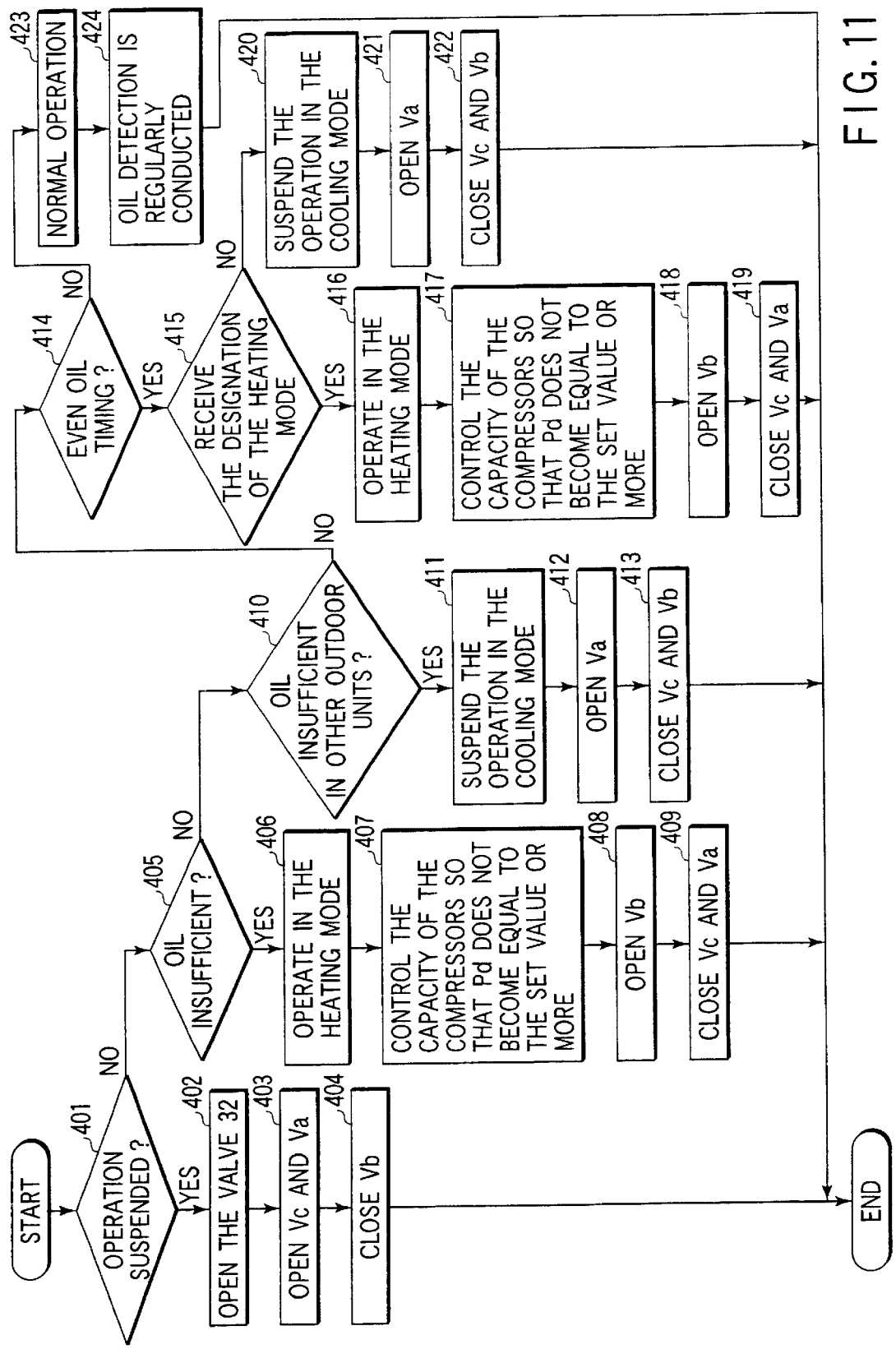
FIG. 11 is a flowchart for explaining a control of a fourth embodiment.

Next, an operation of each of the outdoor units 1 and 2 will be explained by referring to the flowchart of FIG. 11.

When the oil surface in the case 10c of the compressor 10 is higher than the connection position of the oil traveling pipe 41, the lubrication oil L for the portion higher than the connection portion travels to the oil holding tank 40 through the oil traveling pipe 41.

When the operation of any of each of the outdoor units 1 and 2 is suspended (YES at step 401), the valve 32 of the release bypass is opened in the suspended outdoor unit (step 402). Then the valve Vc and Va are opened (step 403), the valve Vb is opened (step 404).

When the valve 32 is opened, the pressure balance between the piping on the high pressure side and the piping on the low pressure side progresses. Up to the time when the pressure balance is completed, the pressure on the high pressure is applied to the oil holding tank 40 through the valve Vc so that the lubrication oil L in the oil holding tank 40 flows out to the oil recycling pipe 45. The lubrication oil L that flows out passes through the valve Va to flow to the oil balance pipe 50.

A sucking pressure of the compressor 10 in the outdoor unit which is operated is applied to the oil balance pipe 50 through the pipe 25 on the side of sucking the refrigerant and the oil recycling pipe 45. Consequently, the lubrication oil L which has flown to the oil balance pipe 50 flows into the oil recycling pipe 45 in the outdoor unit which is operated, and is sucked into the compressor 10 through the capillary tube 47 and the pipe 25 on the side of sucking the refrigerant.

In the case where any of each of the center outdoor units 2 is suspended and the remaining terminal outdoor units 2 are operated when the center outdoor unit 1 is operated, the state in which the lubrication oil L flows from the suspended terminal outdoor units 2 to the center outdoor unit 1 and the terminal outdoor units which are operated is shown by an arrow in FIG. 1. In an example shown in FIG. 1, the operation of the third terminal outdoor unit 1 from the right is suspended, and the other outdoor units 1 and 2 are operated.

In this manner, the shortage of the lubrication oil L is prevented by the control of each of the pressuring pipes 52 and each of the oil recycling pipes 45 so that the surplus portion of the lubrication oil L retained in the suspended outdoor units flows to the operating outdoor units.

On the other hand, the oil amount of the compressor 10 in each of the suspended outdoor units 1 and 2 is detected with each of the oil amount detector in the same manner as the second embodiment.

When the shortage of the lubrication oil L is detected in any of the compressors 1 and 2 (YES at step 405), the heating mode is set (the four-way valve 15 is turned on), and the operation in the heating mode continues (step 406). Furthermore, the capacity of the compressor 10 is controlled (step 407) so that the pressure Pd of the high-pressure refrigerant detected with the pressure sensor 26 does not become equal to the set value (the allowed design pressure value which is the specification of the low pressure). Then, the valve Vb is opened (step 408), and the valves Vc and Va are opened (step 409).

The generation of the shortage of the lubrication oil L is notified to the center outdoor unit 1, and the generation is notified from the center outdoor unit 1 to the other terminal outdoor unit 2.

In the outdoor units where the shortage of the lubrication oil L in the other outdoor units is notified (YES at step 410), the cooling mode (the four-way valve 15 is turned off) is set, and the operation is suspended (step 411). Then, the valve Va is opened (step 412), and the valves Vc and Va are closed (step 413).

Figure 12:
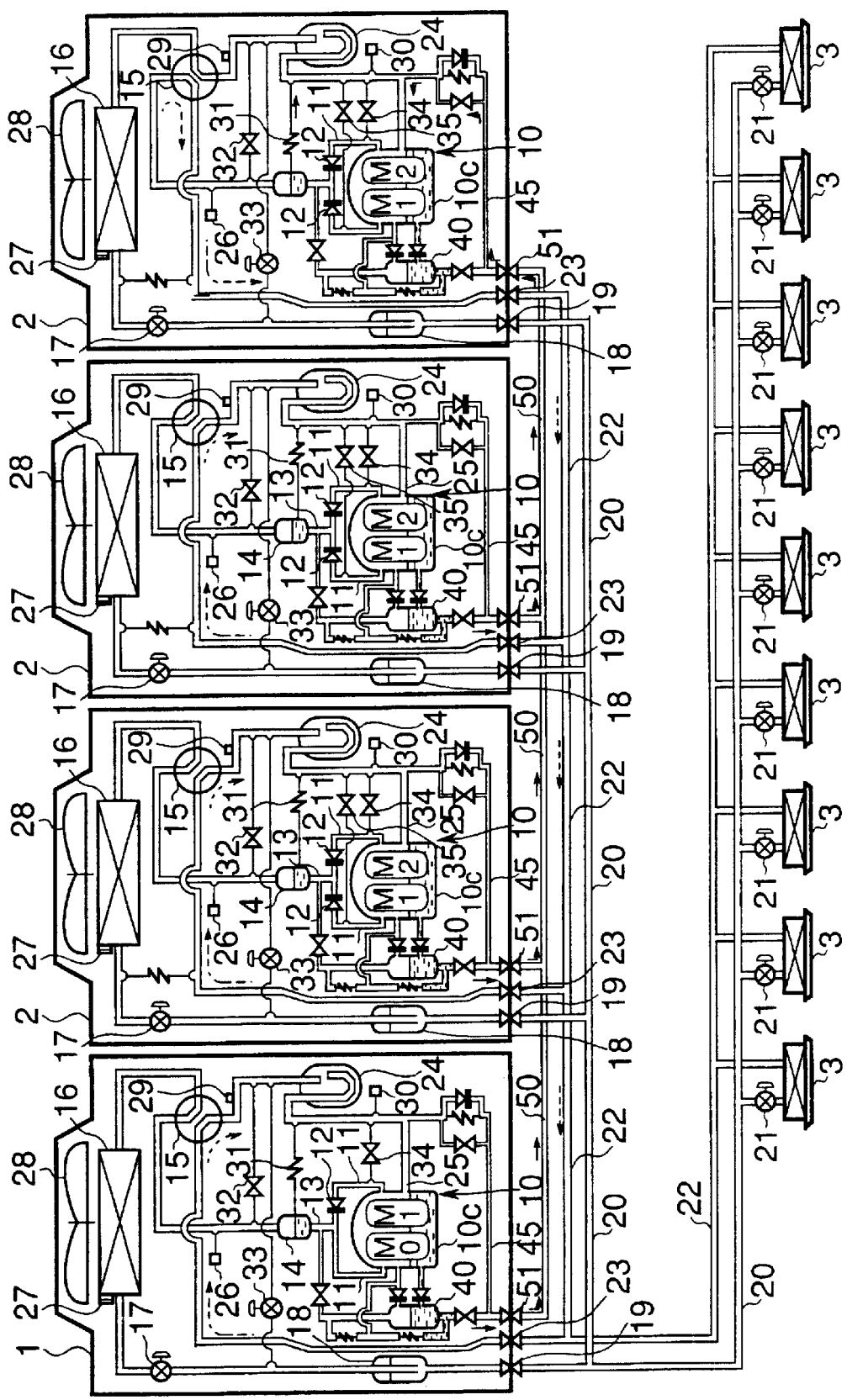
FIG. 12 is a view showing an example of a flow of the refrigerant and the lubrication oil in the fourth embodiment.
Figure 13:
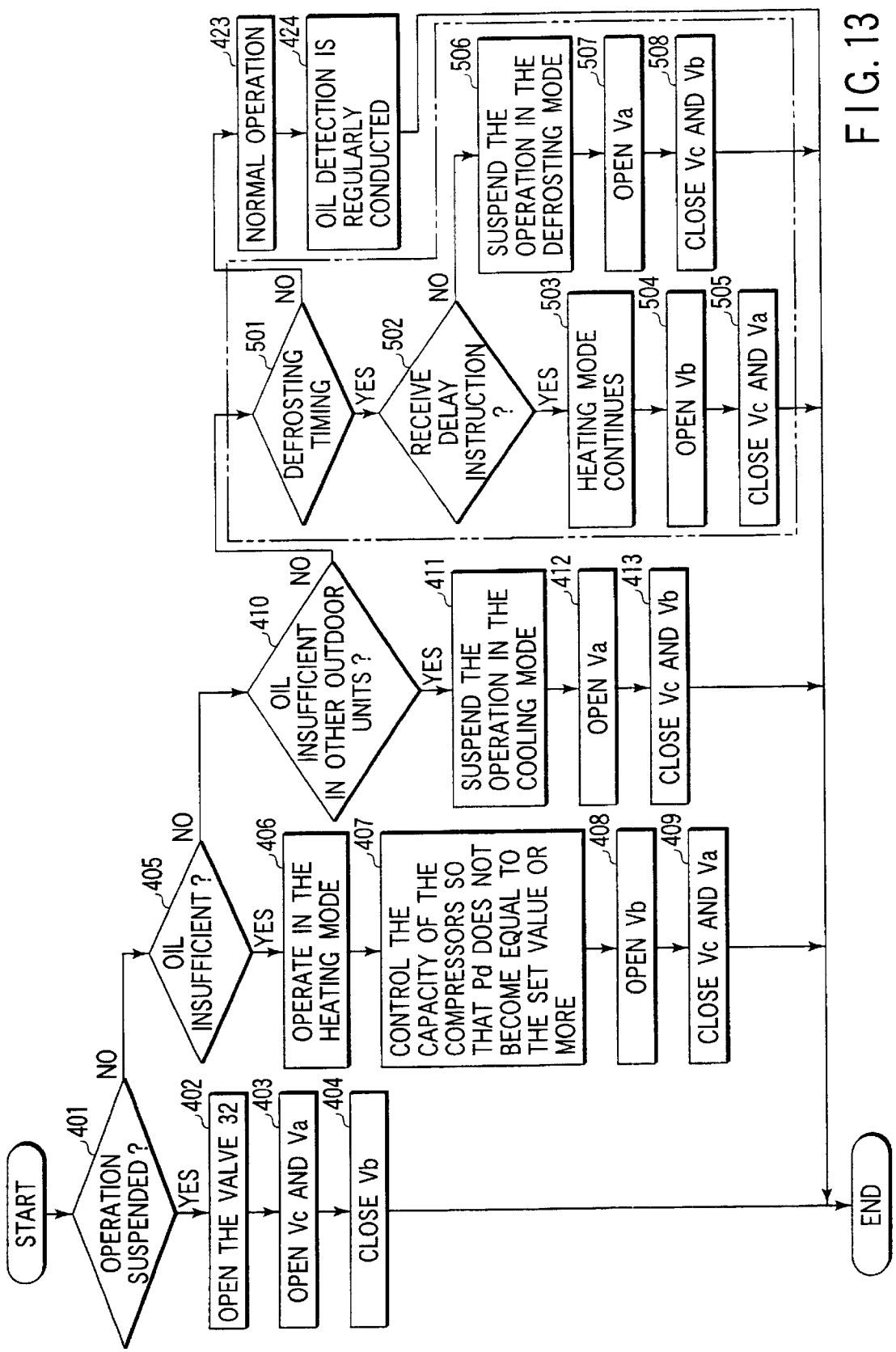
FIG. 13 is a flowchart for explaining a control of the fifth embodiment.

For example, in FIG. 12, when the shortage of the lubrication oil L is generated in the terminal outdoor unit 2 on the right end, the heating mode is set in the outdoor unit 2 on the right end. Then, the discharged refrigerant (the high-pressure refrigerant) of the compressor 10 flows to the pipe 22 on the gas side via the four-way valve 15 as shown by a broken line arrow.

The high-pressure refrigerant flowing to the pipe 22 on the gas side flows into the outdoor unit 1 and 2 in which the cooling mode is set, so that the refrigerant is introduced to the case 10c of each of the compressors 10 via the four-way valves 15 respectively. In this manner, a surplus portion of the lubrication oil L in each of the cases 10c travels to the oil holding tank 40 by the pressuring of the inside of each of the cases 10c. The lubrication oil L flows into the oil balance pipe 50 through the valve Vb and the oil recycling pipe 45 by the opening of the valve Va.

A sucking pressure of the compressor 10 in the outdoor unit 2 in which the heating mode is set is applied to the oil balance pipe 50 through the pipe 25 on the side of sucking the refrigerant and the oil recycling pipe 45. Consequently, the lubrication oil L which has flown into the oil balance pipe 50 flows into the oil recycling pipe 45 of the outdoor unit 2 in which the heating mode is set. The lubrication oil L is sucked into the compressor 10 through the valve Va and the pipe 25 on the side of sucking the refrigerant.

In this manner, the shortage of the lubrication oil L can be swiftly settled by supplying the surplus portion of the lubrication oil L from the outdoor units to the compressor 10 of the outdoor units in which the shortage of lubrication oil L is detected.

Furthermore, at the regular even oil timing based on the time count of the timer 73 of the outdoor control portion 70 (YES at step 414), the following control is conducted in the case where the oil amount is appropriate between respective outdoor units 1 and 2, and the balance state continues.

In the outdoor units in which the heating mode is designated (YES at step 415), the heating mode (the four-way valve 15 is turned on) is set, and the operation in the heating mode continues (step 416). Furthermore, the capacity of the compressor 10 is controlled so that the pressure Pd detected with the pressure sensor 26 does not become equal to the preset set value (the allowed design pressure value of the case 10c having a low pressure specification) (step 417). Then, the valve Vb is opened (step 418) and the valves Vc and Va are closed (step 419).

The designation of the heating mode is controlled with the center outdoor unit 1 and at least one of each of the outdoor units 2 and the designation is conducted in order at every even oil timing.

In the outdoor units in which the heating mode is not designated (NO at step 415), the cooling mode (the four-way valve 15 is turned off) is set, and the operation is suspended (step 420). Then, the valve Va is opened (step 421), and the valves Vc and Vb are closed (step 422).

For example, in FIG. 12, in the case where the terminal outdoor unit 2 on the right end is designated to the heating mode, the discharged refrigerant of the compressor 10 flows to the pipe 22 on the gas side via the four-way valve 15 as shown by a broken line arrow.

The high pressure refrigerant which flows to the pipe 22 on the gas side flows into the outdoor units 1 and 2 in which the cooling mode is set, and is introduced to the case 10c of each of the compressors 10 via the four-way valves 15 respectively. In this manner, the surplus portion of the lubrication oil L travels to the oil holding tank 40 by the pressuring of the inside of each of the cases 10c. The lubrication oil L which has traveled to the oil holding tank 40 flows to the oil balance pipe 50 through the valve Va and the oil recycling pipe 45.

The sucking pressure of the compressor 10 in the outdoor units 2 in the heating mode is applied to the oil balance pipe 50 through the pipe 25 on the side of sucking the refrigerant and the oil recycling pipe 45. Consequently, the lubrication oil L which has flowed to the oil balance pipe 50 flows into the oil recycling pipe 45 in the outdoor unit 2 in the heating mode, and is sucked into the compressor 10 through the valve Vb and the pipe 25 on the side of sucking the refrigerant.

In this manner, any of each of the outdoor units 1 and 2 is regularly designated, and a surplus portion of the lubrication oil L is supplied from the other outdoor units to the compressor 10 of the designated outdoor unit, so that a deviation in the lubrication oil L return generated along with the progress of the operation can be corrected.

When the judgment at the above steps 401, 405, 410 and 414 are both denied (NO), a normal operation is conducted (step 423), and the oil amount detection is regularly conducted to detect whether the amount of the lubrication oil L is appropriate or insufficient (step 424).

As has been described above, the shortage of the lubrication oil L at each of the compressors 10 can be swiftly settled in a mutually compensating manner, and a large contribution can be made toward the improvement of the life of the compressor 10 and the improvement of the reliability thereof.

Since the surplus portion of the lubrication oil L is constantly stored in an oil holding tank different from the oil separator 14, an attempt can be made to reduce the capacity of the oil separator, and in the end to reduce of the size of the whole refrigeration apparatus.

[5] A fifth embodiment will be explained hereinafter.

Instead of the processing at steps 414 through 422, processing at steps 501 through 508 is adopted as shown by two dot chain lines which surround the processing in the flowchart.

That is, in the outdoor units (YES at step 502) which receives a delay instruction from the indoor outdoor units 1 at the regular defrosting timing (YES at step 501) in the case where each of the compressors 10 is operated in the heating mode, the operation in the heating mode (the four-way valve 15 is turned on) continues (step 503), and, at the same time, the valve Vb is opened (step 504). The valves Vc and Va are closed (step 505).

The delay instruction is controlled with the center outdoor unit 1, and the instruction is sent to the center outdoor unit 1 and each of the terminal outdoor unit 2 in order.

At the outdoor unit where the delay instruction is not given (NO at step 502), the operation in the cooling mode (the four-way valve 15 is turned off), namely in the defrosting mode is suspended (step 506). Then, the valve Va is opened (step 507), and the valve Vc and Vb are closed (step 508).

For example, in FIG. 8 in the case where the terminal outdoor unit 2 receives a delay instruction, the heating mode operation continues in the outdoor unit 2 on the right end. The discharged refrigerant (the high-pressure refrigerant) of the compressor 8 flows to the pipe 22 on the gas side via the four-way valve 15 as shown by the broken line arrow.

The high-pressure refrigerant which has flown to the pipe 22 on the gas side flows to the outdoor units 1 and 2 which is suspended in operation in the defrosting mode, and is introduced to the case 10c of each of the compressors 10 via the four-way valves 15 respectively. In this manner, the surplus portion of the lubrication oil L in each of the cases 10 travels to the oil holding tank 40. The lubrication oil L which travels to the oil holding tank 40 flows to the oil balance pipe 50 through the valve Va and the oil balance pipe 45 by the opening of the valve Va.

A sucking pressure of the compressor 10 in the outdoor units 2 in the heating mode is applied to the oil balance pipe 50 via the pipe 25 on the side of sucking the refrigerant and the oil recycling pipe 45. Consequently, the lubrication oil L which has flown to the oil balance pipe 50 flow into the oil recycling pipe 45 of the outdoor units 2 in which the heating mode is set, and the lubrication oil L is sucked into the compressor 10 via the valve Vb and the pipe 25 on the side of sucking the refrigerant.

The delay instruction is relieved after a definite time. As a consequence, the outdoor units which continues the operation in the heating mode is changed over to the defrosting mode, and at the same time, the outdoor units which are suspended in the defrosting mode resumes the operation, and all the outdoor units enters into the defrosting operation.

In this manner, at the time of the start of the defrosting operation, a surplus portion of the lubrication oil L can be supplied from the other outdoor units to the compressor 10 of the outdoor units to be delayed by delaying the change-over of the refrigerant flow in at least one of each of the outdoor units 1 and 2. Consequently, a deviation in the lubrication oil L return generated along with the progress of the operation can be corrected.

The other structure, the operation and the advantage of the fifth embodiment is the same as the fourth embodiment.

[6] A sixth embodiment will be explained.

Figure 14:
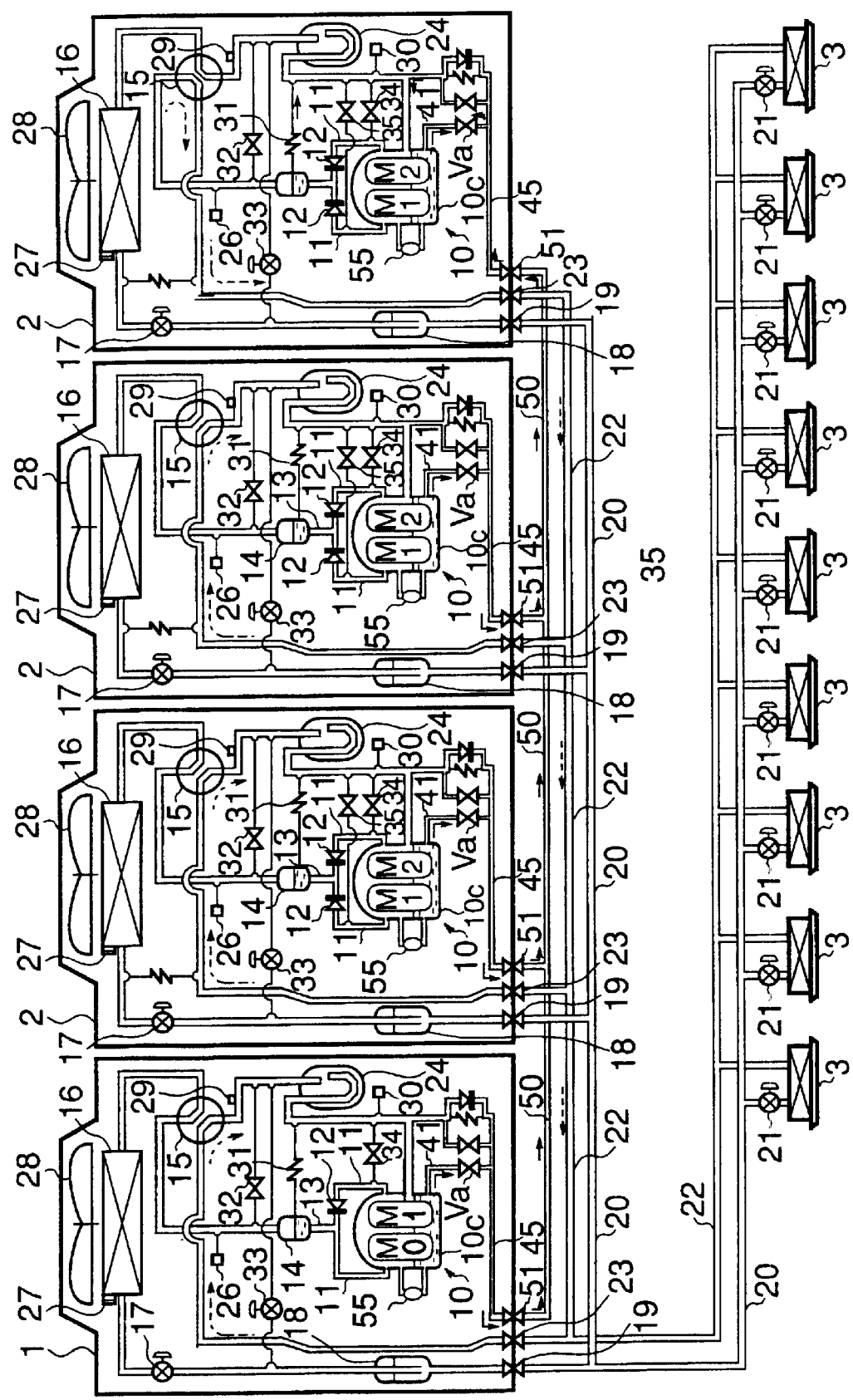
FIG. 14 is a view showing a structure of a sixth embodiment.

As shown in FIG. 14, a float switch style oil amount detector 55 is provided as detection means for detecting the oil amount in the case 10c of each of the compressors 10 in the place of the oil amount detector having oil tanks as constituent elements. Along with this, the case 10c and the oil recycling pipe 45 are directly connected with the oil traveling pipe without the intervention of the oil holding tank 40. Then, the valve Va is provided on the oil traveling pipe 41.

The other structure of the sixth embodiment is the same as the fourth and the fifth embodiment, and the operation and the advantage same as the fourth and the fifth embodiment can be obtained.

INDUSTRIAL APPLICABILITY

The present invention can be applied to a device provided with a compressor in the same manner in addition to the air conditioner.

What is claimed is:

1. An oil amount detector of a compressor having a case filled with a lubrication oil, sucking and compressing refrigerant to discharge the refrigerant from the case; the detector comprising:

an oil holding tank communicated to the case;

a pressuring pipe for introducing part of the refrigerant discharged from the compressor to the oil holding tank for use in pressurization for allowing oil to flow from the oil holding tank;

a return pipe for allowing oil flowing out of the oil holding tank to return to the case of the compressor;

a first temperature sensor for detecting a temperature of a refrigerant which is introduced to the oil holding tank;

a second temperature sensor for detecting a temperature of oil flowing out from the oil holding tank; and detection means for detecting an oil amount in the case from a contrast between the detected temperature of the first temperature sensor and the detected temperature of the second temperature sensor.

2. The detector according to claim 1, further comprising:

an oil traveling pipe connected between a predefined appropriate oil surface position of the case and the oil holding tank; and a pressure balance pipe connected between the upper portion than the appropriate oil surface position of the case and the oil holding tank.

3. The detector according to claim 1, further comprising:

an oil traveling pipe connected between a preset appropriate oil surface position of the case and the oil holding tank;

a pressure balance pipe connected between the upper portion than the appropriate oil surface position of the case and the oil holding tank;

a check valve provided on the oil traveling pipe to suspend the reverse flow of the oil from the oil holding tank to the case; and a check valve provided on the pressure balance pipe to suspend the flow of the refrigerant into the case from the oil holding tank;

a bypass pipe connected from the halfway portion of the pressurizing pipe to the return pipe;

a pressure reducer provided on the upstream side from the connection portion of the bypass pipe in the return pipe; and a pressure reducer provided on the bypass pipe.

4. The detector according to claim 3, wherein one end of the return pipe is communicated to the oil holding tank while the other end thereof is communicated to the case via part of the pressure balance pipe, a first temperature sensor detects the temperature of the refrigerant flowing through the bypass pipe, and a second temperature sensor detects a temperature of oil flowing through the return pipe.

5. The detector according to claim 1, further comprising an open and close valve provided on the pressuring pipe.

6. The detector according to claim 5, wherein detection means regularly opens the open and close valve, and conducts the detection when opened.

7. The detector according to claim 1, wherein the detection means detects the presence of oil in the oil holding tank from a difference between the detected temperature of the first temperature sensor and the detected temperature of the temperature sensor to detect whether or not the oil amount in the case is appropriate.

8. The detector according to claim 1, wherein the detection means detects whether or not the oil amount is appropriate or not on the basis of the change with the lapse of time in a difference between the detected temperature of the first temperature sensor and the detected temperature of the second temperature sensor.

9. The detector according to claim 1, wherein the detection means detects the time from the rise of the detected temperature of the first temperature sensor up to the rise of the detected temperature of the second temperature sensor to detect whether or not the oil amount is appropriate from a comparison between the detection time and the predefined set value.

10. The detector according to claim 1, wherein the detection means starts time count tn at the time when the change amount $\Delta TK1$ of the detected temperature of the first temperature sensor is consecutively grasped and the change amount $\Delta TK1$ becomes equal to a predetermined value $\beta$ or more, or at the time when the detected temperature TK1 becomes higher than the initial value TK1(0) of the detected temperature by a predetermined value $\alpha$ or more, and then after that the detection means judges the oil amount in the case is appropriate if the time count tn is equal to the predefined set value tns or more when the change amount $\Delta TK2$ of the detected temperature of the second temperature sensor is consecutively grasped and the change amount $\Delta TK2$ becomes equal to the predefined predetermined value $\Delta T$ or more, or when the detected temperature TK1 at the time when the time count tn reaches the predefined set value ts is memorized as TK1max so that the change amount from the initial value TK2(0) of the detected temperature TK2 of the second temperature sensor becomes equal to a difference between the initial value TK1(0) and the TK1max; whereas if the value is less than the set value tns, the detection means judges that the oil amount in the case is insufficient.

11. The detector according to claim 10, wherein the set value ts, the predetermined value $\Delta T$ and the set value tns are variably set by using as a parameter a compression ratio of the refrigerant in the compressor and using as a parameter a difference in pressure between a pressure of the refrigerant discharged from the compressor and a pressure of the refrigerant sucked into the compressor.

12. The detector according to claim 1, further comprising:

an oil recycling pipe connected between the oil holding tank and the pipe on the side of sucking the refrigerant which is sucked into the compressor; and control means for refueling oil in the oil holding tank to the compressor by conducting and controlling the oil recycling pipe.

13. A refrigeration apparatus comprising:
a plurality of compressors having a case filled with lubrication oil, the compressors sucking and compressing refrigerant to discharge the refrigerant from the case;
oil holding tanks respectively communicated to the cases of the compressors;
pressuring pipes for introducing part of the refrigerant discharged from the compressor into the oil holding tanks for use in pressurization for allowing oil to flow out from the oil holding tank;
return pipes for allowing oil flowing out from the oil holding tank to return to the case of the compressors;
first temperature sensors for detecting respectively the temperature of the refrigerant which is introduced to the oil holding tank;
second temperature sensors for detecting respectively the temperature of the refrigerant which flows out from the oil holding tank;
detection means for detecting respectively an oil amount in the case of the compressors from a contrast between the detected temperature of the first temperature sensors and the detected temperature of the second temperature sensors;
oil recycling pipes connected between oil holding tanks and pipings on the side of sucking the refrigerant, the pipings allowing the refrigerant to be sucked to the compressors to pass therethrough;
an oil balance pipe mutually connected to the oil recycling pipes; and
control means for refueling oil in the oil holding tank to the compressors by conducting and controlling the oil recycling pipes.

14. An air conditioner comprising:
a plurality of compressors having a case filled with lubrication oil, sucking and compressing refrigerant to discharge the refrigerant from the cases;
a plurality of outdoor units provided with the compressors;
a plurality of indoor units;
a refrigerating cycle constituted of the piping connection of the outdoor units and the indoor units;
oil holding tanks respectively connected to the case of the compressors;
pressuring pipes for respectively introducing a part of the refrigerant discharged from the compressors for use in pressurization for allowing the oil to flow out from the oil holding tanks;
oil recycling pipes respectively connected between the oil outflow port of the oil holding tanks and the piping on the side of sucking the refrigerant, the piping allowing the refrigerant sucked in the compressor to pass therethrough; and
oil balance pipes mutually connected between the oil recycling pipes.

15. The air conditioner according to claim 14; further comprising:
oil traveling pipes connected between predefined appropriate oil surface position of the case of compressors and the oil holding tanks; and
pressure balance pipes connected between the upper portion than the appropriate oil surface position of the case of the compressors and the oil holding tanks.

16. The air conditioner according to claim 14, further comprising:
detection means for respectively detecting whether the oil amount in the case of the compressors is appropriate or insufficient; and
control means for controlling the conduction of the pressuring pipes and the oil recycling pipes so that oil in the oil holding tanks flow to the compressors in which the shortage of the oil amount is detected with the detection means.

17. The air conditioner according to claim 14, further comprising:
control means for controlling the conduction of the pressuring pipes and the oil recycling pipes so that the oil amount is balanced mutually between the outdoor units.

18. The air conditioner according to claim 17, wherein the control means controls the conduction of the pressuring pipes and the oil recycling pipes so that the oil retained in the outdoor units on the side of a low operation ratio is temporarily collected in the outdoor units on the side of a high operation ratio on a regular basis, and the collected oil is allowed to return to the outdoor units on the side of the low operation ratio.

19. The air conditioner according to claim 14, further comprising:
control means for controlling the conduction of the pressuring pipes and the oil recycling pipes so that oil retained in the suspended outdoor units out of the outdoor units flows to the outdoor units which is operated.

20. An air conditioner comprising:
a plurality of outdoor units having a compressor having a case filled with lubrication oil, sucking and compressing refrigerant to discharge the refrigerant from the case, a change-over valve changing over a refrigerant flow in the cooling mode and a refrigerant flow in the heating mode, and an outdoor heat exchanger;
a plurality of indoor units having an indoor heat exchanger;
a heat pump type refrigerating cycles constituted of the piping connection of the compressors, the change-over valves, the outdoor heat exchangers, and the indoor heat exchangers, the pipes on the liquid side are shared by one pipe and the pipes on the gas side are shared by one pipe;
oil traveling pipes respectively connected to the case of the compressors;
oil recycling pipes connected from the oil traveling pipes to pipings on the side of sucking the refrigerant, the pipings allowing the refrigerant to be sucked to the compressors to pass therethrough;
an oil balance pipe mutually connected between the oil recycling pipes; and
control means for setting at least one of the outdoor units to a heating mode while setting the remaining outdoor units to a cooling mode, and at the same time, operating the outdoor units set to the heating mode while suspending the outdoor units set to the cooling mode.

21. The air conditioner according to claim 20, wherein detection means is provided for detecting whether or not the oil amount in the case is appropriate or insufficient.

22. The air conditioner according to claim 21, wherein the control means sets to the heating mode the outdoor units having the compressors in which the oil amount is insufficient in the case where the detection means detects the shortage of oil amount.

23. The air conditioner according to claim 20, wherein the control means regularly conducts control.

24. The air conditioner according to claim 20, wherein the oil traveling pipes are connected to the appropriate oil surface position of the cases.

25. The air conditioner according to claim 20, further comprising the oil holding tanks respectively provided between the connection between the oil traveling pipes and the oil recycling pipes.

26. An air conditioner comprising:

a plurality of outdoor units having a compressor having a case filled with lubrication oil, sucking and compressing refrigerant to discharge the refrigerant from the case, a change-over valve changing over a refrigerant flow in the cooling mode, a refrigerant flow in the heating mode and a refrigerant flow in the defrosting mode and an outdoor heat exchanger;

a plurality of indoor units having an indoor heat exchanger;

a heat pump type refrigerating cycles constituted of the piping connection of the compressors, the change-over valves, the outdoor heat exchangers, and the indoor heat exchangers, the pipes on the liquid side are shared by one pipe and the pipes on the gas side are shared by one pipe;

oil traveling pipes respectively connected to the case of the compressors;

oil recycling pipes connected from the oil traveling pipes to pipings on the side of sucking the refrigerant, the pipings allowing the refrigerant to be sucked to the compressors to pass therethrough;

an oil balance pipe mutually connected between the oil recycling pipes;

control means for changing over the outdoor units to the defrosting mode on a regular basis or when needed in the case where the outdoor units are set to the heating mode to conduct a defrosting operation with respect to the outdoor heat exchanger; and control means for delaying the defrosting mode from the heating mode in at least one of the outdoor units at the time of the start of the defrosting operation, and operating the outdoor unit which is to be delayed while suspending the operation of the remaining outdoor units in the defrosting mode.

27. The air conditioner according to claim 26, wherein the oil traveling pipes are connected to the appropriate oil surface position of the cases.

28. The air conditioner according to claim 26, further comprising oil holding tanks respectively provided between the connection between the oil traveling pipes and the oil recycling pipes.

* * * * *